(12) United States Patent
Horie

(10) Patent No.: US 8,041,138 B2
(45) Date of Patent: Oct. 18, 2011

(54) IMAGE PROCESSOR

(75) Inventor: Gen Horie, Tokyo (JP)

(73) Assignee: Olympus Corporation, Tokyo (JP)

( * ) Notice: Subject to any disclaimer, the term of this patent is extended or adjusted under 35 U.S.C. 154(b) by 938 days.

(21) Appl. No.: 12/011,231

(22) Filed: Jan. 24, 2008

(65) Prior Publication Data

US 2008/0175511 A1 Jul. 24, 2008

(51) Int. Cl.
*G06K 9/40* (2006.01)

(52) U.S. Cl. .......................................... 382/254

(58) Field of Classification Search .................. 382/254, 382/260–266, 274–275, 232–251, 166; 348/241, 348/252, 607; 375/240.01–240.29
See application file for complete search history.

(56) References Cited

U.S. PATENT DOCUMENTS

| 6,125,143 | A  | * | 9/2000  | Suzuki et al. | ............ | 375/240.11 |
| 7,260,266 | B2 | * | 8/2007  | Nakajima et al. | ............ | 382/240 |
| 7,308,152 | B2 | * | 12/2007 | Ito | ................................ | 382/260 |
| 7,898,583 | B2 | * | 3/2011  | Wakahara et al. | ............ | 348/252 |
| 2002/0041706 | A1 | | 4/2002 | Nakase |
| 2004/0066850 | A1 | | 4/2004 | Nakajima et al. |
| 2004/0207881 | A1 | | 10/2004 | Nomura |
| 2004/0252907 | A1 | | 12/2004 | Ito |

FOREIGN PATENT DOCUMENTS

| EP | 1 408 448 A2 | 4/2004 |
| JP | 08-163408 A | 6/1996 |
| JP | 2000-069291 A | 3/2000 |
| JP | 2002-77657 A | 3/2002 |
| JP | 2002-344743 A | 11/2002 |
| JP | 2003-134352 A | 5/2003 |
| JP | 2004-127064 A | 4/2004 |
| JP | 2004-318423 A | 11/2004 |
| WO | WO 03/036939 A1 | 5/2003 |

* cited by examiner

*Primary Examiner* — Ishrat I Sherali
(74) *Attorney, Agent, or Firm* — Holtz, Holtz, Goodman & Chick, P.C.

(57) ABSTRACT

An image taken via lens system (100) and CCD (101) is converted at A/D (102) into digital signals that are then stored in buffer (103). An output of buffer (103) is connected to output block (106) via noise reduction processing block (104), edge enhancement processing block (107) and signal processing block (105) in order. Noise reduction processing block (104) separated an image signal read out of buffer (103) into multiple frequency components. Transform processing is applied to the respective separated components that are then synthesized for noise reductions.

16 Claims, 19 Drawing Sheets

FIG. 3

| G | R | G | R | G |
|---|---|---|---|---|
| B | G | B | G | B |
| G | R | G | R | G |
| B | G | B | G | B |
| G | R | G | R | G |

FIG. 4(a)    FIG. 4(b)    FIG. 4(c)

H1, H2, H3, H4 — First, Second, Third, Fourth (45° oblique high frequency)

H5, H6, H7, H8 — First, Second, Third, Fourth (135° oblique high frequency)

H9, H10, H11, H12 — First, Second, Third, Fourth (Horizontal/vertical high frequency)

FIG. 5

| 0 | 0 | 1 | 0 | 0 |
|---|---|---|---|---|
| 0 | 2 | 0 | 2 | 0 |
| 1 | 0 | 4 | 0 | 1 |
| 0 | 2 | 0 | 2 | 0 |
| 0 | 0 | 1 | 0 | 0 |

/16

Low-frequency extraction filter 1

FIG. 7

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

Residual high-frequency extraction filter

FIG. 6

| 1 | 0 | 2 | 0 | 1 |
|---|---|---|---|---|
| 0 | 3 | 0 | 3 | 0 |
| 2 | 0 | 4 | 0 | 2 |
| 0 | 3 | 0 | 3 | 0 |
| 1 | 0 | 2 | 0 | 1 |

/28

Low-frequency extraction filter 2

FIG. 8

| -4 | 0 | -1 | 0 | -4 |
|----|---|----|---|----|
| 0  | 2 | 0  | 2 | 0  |
| -1 | 0 | 12 | 0 | -1 |
| 0  | 2 | 0  | 2 | 0  |
| -4 | 0 | -1 | 0 | -4 |

/112

Residual high-frequency extraction filter

F I G. 9(a)
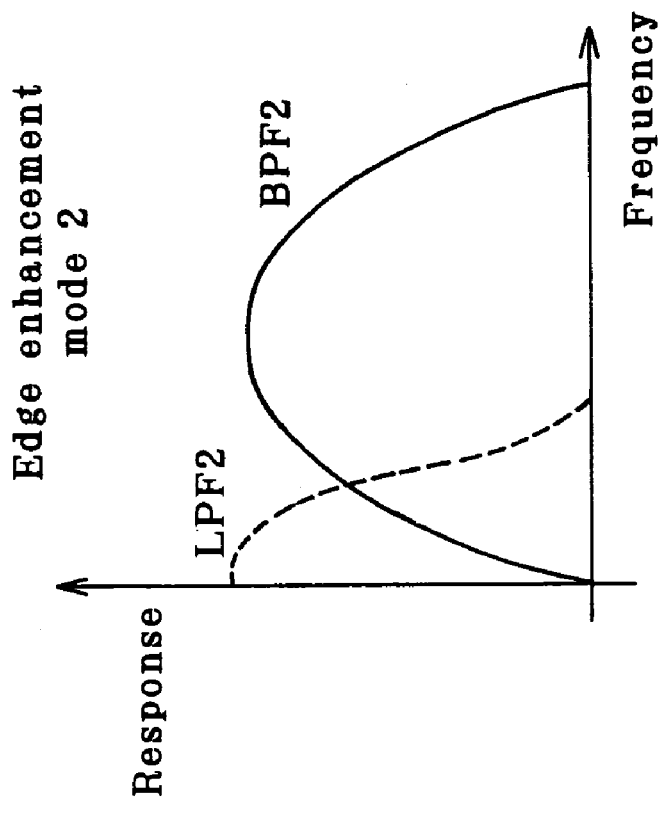
F I G. 9(b)
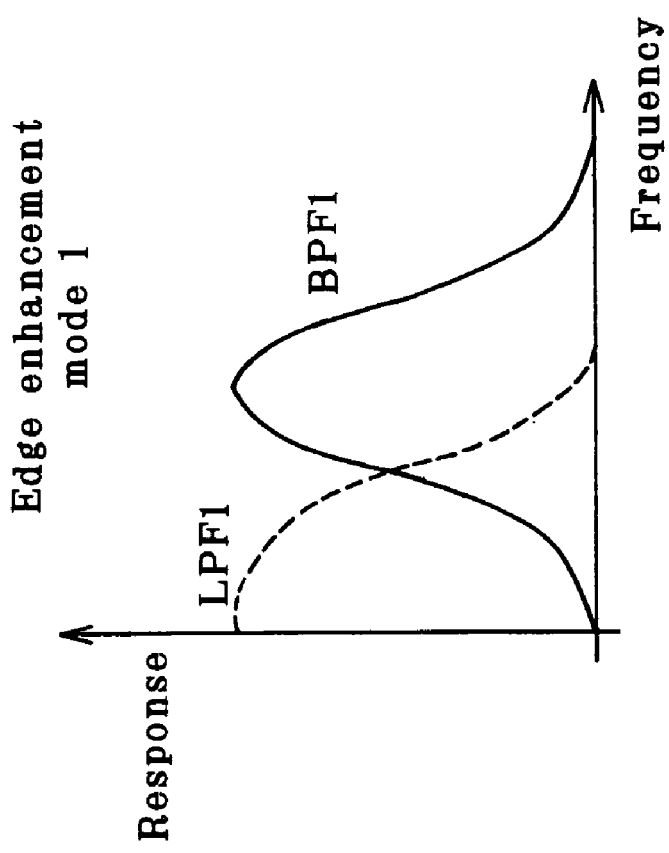

FIG. 16(a)    FIG. 16(b)    FIG. 16(c)

H1, H5, H9 — First

H2, H6, H10 — Second

H3, H7, H11 — Third

H4, H8, H12 — Fourth

/36

Horizontal high frequency    Vertical high frequency    Oblique high frequency

FIG. 17

| 1 | 0 | 2 | 0 | 1 |
|---|---|---|---|---|
| 0 | 4 | 0 | 4 | 0 |
| 2 | 0 | 8 | 0 | 2 |
| 0 | 4 | 0 | 4 | 0 |
| 1 | 0 | 2 | 0 | 1 |

First

H2
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

H6
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

H10
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

Second

H3
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

H7
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

H11
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

Third

H4
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

H8
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

H12
| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

Fourth

Horizontal high frequency   Vertical high frequency   Oblique high frequency

IMAGE PROCESSOR

ART FIELD

The present invention relates to an image processor adapted to separate the image to be processed into multiple frequency components and apply image processing such as noise reductions to them.

BACKGROUND ART

With image processors, processing for noise reductions, etc. is implemented for the purpose of preventing image deteriorations. As set forth typically in JP(A)2000-69291, smoothing filter size is changed on the basis of the noise characteristics of an image input medium to apply smoothing processing to an image, wherein image deteriorations are prevented and fast operation is achievable.

However, problems with the prior art technique set forth in the aforesaid JP(A)2000-69291 are:
(1) the characteristics of smoothing processing are changed depending on the noise characteristics of the image input medium; the frequency characteristics for transform processing cannot be changed in association with a change in the frequency characteristics of an output medium or post-processor, and (2) smoothing filter size is changed on the basis of the noise characteristics to apply smoothing processing to the image. Therefore, the prior art cannot be compatible with a plurality of filters.

The present invention has been made with such problems with the prior art in mind, and has for its object the provision of an image processor that can provide a solution to the aforesaid problems (1) and (2) so that it can be compatible with a change in the frequency characteristics of a post-processor, and offer a sensible tradeoff between proper noise reductions and holding the details of an image.

DISCLOSURE OF THE INVENTION (1) To accomplish the aforesaid object, the first embodiment of the invention provides an image processor, characterized by comprising a frequency division means for dividing an input signal into a low-frequency component and at least one high-frequency component, a high-frequency component transform means for applying transform processing to said high-frequency component, a frequency synthesis means for synthesizing said low-frequency component with the high-frequency component to which said transform processing has been applied, a frequency characteristics setting means for setting frequency characteristics needed for an output signal, a frequency characteristics adjustment means that applies further transform processing to an output signal from said frequency synthesis means to adjust the frequency characteristics of the output signal to frequency characteristics set by said frequency characteristics setting means, and a frequency division characteristics setting means for setting division characteristics at said frequency division means depending on frequency characteristics set at the frequency characteristics setting means.

The invention (1) is embodied in the form of the first embodiment shown in FIGS. 1 to 10. In the arrangement of the invention (1), corresponding to the frequency division means are the low-frequency extraction block 200 and the high-frequency extraction block 201 shown in FIG. 2. Corresponding to the frequency synthesis means is the synthesis block 209 shown in FIG. 2. Corresponding to the frequency characteristics setting means is the edge enhancement parameter setting block 108 shown in FIGS. 1 and 2. Corresponding to the frequency characteristics adjustment means is the edge enhancement processing block 107 shown in FIGS. 1 and 2. Corresponding to the frequency division characteristics setting means are the LPF filter coefficient setting block 222 and the HPF filter coefficient setting block 221 shown in FIG. 2.

According to the invention (1), the frequency division characteristics setting means works setting the frequency division characteristics depending on the frequency characteristics set by the frequency characteristics setting means. Depending on the adjustment of the frequency characteristics at the frequency characteristics adjustment means, there is a change in how to divide the frequency at the frequency division means. According to this arrangement, even when the frequency characteristics are adjusted as desired, it is possible to prevent accidental adjustment from being made of a specific frequency component, thereby preventing the occurrence of artifacts.

The invention (2) is characterized in that said frequency characteristics adjustment means in said invention (1) comprises a given frequency component extraction means for extracting a given frequency component from an output signal from said frequency synthesis means, a given frequency component enhancement means for applying given enhancement processing to said given frequency component extracted by said given frequency component extraction means, and a given frequency component synthesis means for synthesizing said given frequency component to which said given enhancement processing has been applied by said given frequency component enhancement means with an output signal from said frequency synthesis means.

The invention (2) is embodied in the form of the first embodiment shown in FIG. 2. In the arrangement of the invention (2), it is the edge enhancement block 211 that is corresponding to the given frequency component extraction means, and it is the edge addition block 213 that is corresponding to the given frequency component synthesis means. According to the invention (2), at the given frequency component synthesis means, the given frequency component to which the given enhancement processing has been applied by the given frequency component enhancement means in such a way as to change an enhancement coefficient is synthesized with an output signal from the frequency synthesis means of the invention (1), that is, the low-frequency component. According to this arrangement, sharpness is so adjusted that an image signal with an enhanced edge is obtainable.

The invention (3) is characterized in that said frequency characteristics adjustment means in said invention (1) further comprises a low-frequency component extraction means for extracting a given low-frequency component from an output signal from said frequency synthesis means, wherein said given frequency component synthesis means synthesizes said given frequency component to which said given enhancement processing has been applied by said given frequency component enhancement means with said given low-frequency component.

The invention (3) is embodied in the form of the first embodiment shown in FIG. 2. In the arrangement of the invention (3), it is the pixel interpolation block 210 that is corresponding to the low-frequency extraction means. According to the invention (3), the low-frequency component extraction means works creating a G pixel at the center of the block area to be processed, and synthesizing it with the given frequency component to which the given enhancement processing has been applied according to the invention (2) at the given frequency component synthesis means. According to this arrangement, an edge component subjected to transform processing is added to and mixed with the low-frequency component thereby adjusting the sharpness of an image signal.

The invention (4) is characterized in that said high-frequency component transform means in said invention (1) comprises a high-frequency component inhibition means for enhancing or inhibiting an element of said high-frequency component having a given range at a given high-frequency component, and a threshold value setting means for setting at least one threshold value that determines a given range.

The invention (4) is embodied in the form of the first embodiment shown in FIG. 2. In the arrangement of the invention (4), it is the implementation of processing of the characteristics of FIG. 10 that is corresponding to the requirement that said high-frequency component transform means comprises a high-frequency component inhibition means for enhancing or inhibiting an element of said high-frequency component having a given range at a given high-frequency component, and a threshold value setting means for setting at least one threshold value that determines a given range. According to this arrangement, a component whose amplitude is smaller than the threshold value is deleted out of the high-frequency components such as a 45° oblique high-frequency component, a 135° oblique high-frequency component, a horizontal/vertical high-frequency component and a residual high-frequency component, thereby reducing noise.

The invention (5) is characterized in that said frequency characteristics setting means in said invention (1) sets a coefficient for a given frequency extraction filter forming said given frequency component extraction means and/or a quantity of enhancement applied by said given enhancement processing.

The invention (5) is embodied in the form of the first embodiment shown in FIG. 2. In the arrangement of the invention (5), it is the setting of the coefficient for said given frequency component extraction filter that is corresponding to the PBF filter coefficient setting block 231, and it is the setting of the quantity of enhancement applied by the given enhancement processing that is corresponding to the enhancement quantity setting block 232. According to this arrangement, when the frequency characteristics of an edge enhancement processing band-pass filter are changed depending on the adjustment of sharpness, so are the frequency characteristics of a low-frequency extraction filter for noise reduction processing, too. Thus, by changing the frequency characteristics, the frequency characteristics of the low-frequency extraction filter for noise reduction processing are less likely to overlap those of the edge enhancement processing band-pass filter, thereby preventing image quality deteriorations due to the residual noise component being enhanced.

The invention (6) is characterized in that said frequency division characteristics setting means in said invention (1) sets a coefficient for at least one frequency division filter in the group of frequency division filters forming said frequency division means.

The invention (6) is embodied in the form of the first embodiment shown in FIG. 2. The LPF filter coefficient setting block 222 that is the frequency division characteristics setting means works setting a coefficient for such a low-frequency extraction filter as shown in FIG. 5 or 6, and the HPF filter coefficient setting block 221 that is the frequency division characteristics setting means works setting a coefficient for the high-frequency extraction filters (H1 to H12) shown in FIG. 4, and a coefficient for the residual high-frequency extraction filter shown in FIG. 7 or 8. According to this arrangement, transform processing is applied to each high-frequency component extracted by the high-frequency extraction filter having a given coefficient, thereby reducing noises included in the respective high-frequency components.

The image processor according to the invention (7)—that is the second embodiment of the invention—is characterized by comprising a frequency division means for dividing an input signal into a low-frequency component and at least one high-frequency component, a high-frequency component transform means for applying transform processing to said high-frequency component, a frequency synthesis means for synthesizing said low-frequency component with the high-frequency component to which transform processing has been applied, a noise characteristics estimation means for estimating noise characteristics of said input signal, and a frequency division characteristics means for setting division characteristics at the frequency division means depending on a result of estimation at said noise characteristics estimation means.

The invention (7) is embodied in the form of the second and third embodiments shown in FIGS. 11 to 24. The following arrangement according to the invention (7) is shown in FIG. 12. It is the low-frequency extraction block 200, the high-frequency extraction block 201, the second low-frequency extraction block 410 and the second high-frequency extraction block 411 that are corresponding to the frequency division means. It is the high-frequency transform block 202, the high-frequency threshold value computation block 451, the second high-frequency transform block 412 and the second high-frequency threshold value computation block 452 that are corresponding to the frequency component transform means. It is the synthesis block 209 and the second synthesis block 409 that are corresponding to the frequency synthesis means. It is the sensitivity setting block 404 that is corresponding to the noise characteristics estimation means. It is the signal selection block 403 that is corresponding to the frequency division characteristics setting means. Note here that an alternative to the frequency division characteristics setting means is the weighting addition block 500 of FIG. 18 that is used instead of the signal selection block 403 of FIG. 12.

According to the invention (7), the frequency division characteristics setting means works setting the frequency division characteristics depending on the noise characteristics estimated by the noise characteristics estimation means. According to this arrangement, an accidental adjustment is prevented from being made of a specific frequency component depending on the quantity of noise: the occurrence of artifacts can be prevented.

The invention (8) is characterized in that said high-frequency component transform means in the invention (7) comprises a high-frequency component inhibition means for enhancing or inhibiting an element of said high-frequency component having a given range at a given high-frequency component, and a threshold value setting means for setting at least one threshold value for determining the given range.

The invention (8) is embodied in the form of the second embodiment shown in FIG. 12. The high-frequency component transform means that comprises a high-frequency component inhibition means for enhancing or inhibiting an element of said high-frequency component having a given range at a given high-frequency component, and a threshold value setting means for setting at least one threshold value for determining the given range is corresponding to the processing means for implementing the processing of FIG. 10 by the high-frequency threshold value computation block 451 and the second high-frequency threshold value computation block 452. According to this arrangement, by deleting a component whose amplitude is smaller than the threshold value out of high-frequency components in the horizontal, vertical, and oblique directions, noise can be reduced.

The invention (9) is characterized in that the noise characteristics estimation means in the invention (7) comprises a noise quantity estimation means for estimating the quantity of noise included in said input signal on the basis of at least one piece of information about an imaging device temperature, a gain with respect to said input image or a shutter speed at an image-taking time.

The invention (9) is embodied in the form of the second embodiment shown in FIGS. 12 to 15. The high-frequency threshold value computation block 451 in the edge direction adaptable noise reduction processing block 401 shown in FIG. 13, and the second high-frequency threshold value computation block 452 in the edge direction inadaptable noise reduction processing block 402 shown in FIG. 15 each comprises the noise quantity estimation means 806 for estimating the quantity of noise included in said input signal on the basis of at least one piece of information about an imaging device temperature, gain with respect to said input image or a shutter speed at an image-taking time. According to this arrangement, noise reduction processing is controlled depending on a photographic sensitivity whereby, when the photographic sensitivity is low, the original structure included in the image signal is separated from the noise component so that noise reductions are effectively implemented, offering a sensible tradeoff between sharpness improvements and noise reductions. When the photographic sensitivity is high, on the other hand, it is possible to prevent the occurrence of artifacts.

The invention (10) is characterized in that the noise characteristics estimation means in the invention (7) further comprises a gain computation means for finding out said gain on the basis of at least one piece of ISO sensitivity information, exposure information and white balance information.

The invention (10) is embodied in the form of the second embodiment shown in FIGS. 12 to 15. The high-frequency threshold value computation block 451 in the edge direction adaptable noise reduction processing block 401 shown in FIG. 13, and the second high-frequency threshold value computation block 452 in the edge direction inadaptable noise reduction processing block 402 shown in FIG. 15 each comprises the noise quantity estimation means 806 that further comprises a gain computation means for finding out said gain on the basis of at least one piece of ISO sensitivity information, exposure information and white balance information. According to this arrangement, noise reduction processing is controlled depending on a photographic sensitivity whereby, when the photographic sensitivity is low, the original structure included in the image signal is separated from the noise component so that noise reductions are effectively implemented, offering a sensible tradeoff between sharpness improvements and noise reductions. When the photographic sensitivity is high, on the other hand, it is possible to prevent the occurrence of artifacts.

The invention (11) is characterized in that said frequency division characteristics setting means sets a coefficient for at least one frequency division filter in the group of frequency division filters forming said frequency division means.

The invention (11) is embodied in the form of the third embodiment shown in FIG. 19. The coefficient for at least one frequency division filter in the group of frequency division filters forming said frequency division means is set by the filter coefficient setting block 220. According to this arrangement, the extraction filter coefficient set for each high-frequency component is so changed that a changeover is made between edge direction adaptable noise reduction processing and edge direction inadaptable noise reduction processing.

An image processor according to the fourth embodiment of the invention is characterized by comprising a frequency division means for dividing an input signal into a low-frequency component and at least one high-frequency component, a high-frequency component transform means for applying transform processing to said high-frequency component, a frequency synthesis means for synthesizing the low-frequency component with the high-frequency component to which transform processing has been applied, a frequency characteristics estimation means for estimating the frequency characteristics of said input signal, and a frequency division characteristics setting means for setting division characteristics at the frequency division means on the basis of the result of estimation at said frequency characteristics estimation means.

The invention (12) is embodied in the form of the fourth embodiment shown in FIGS. 25 to 28. In the arrangement of the invention (12), it is the horizontal/vertical high-frequency extraction block 201, 45° oblique high-frequency extraction block 203, 135° oblique high-frequency extraction block 205 and residual high-frequency extraction block 207 in FIG. 26, and the oblique high-frequency extraction block 405, vertical high-frequency extraction block 403 and horizontal high-frequency extraction block 421 in FIG. 27 that are corresponding to the frequency division means. It is the horizontal/vertical high-frequency transform processing block 202, 45° oblique high-frequency transform processing block 204, 135° oblique high-frequency transform processing block 206, residual high-frequency transform processing block 208, high-frequency threshold value computation block 451 and residual high-frequency threshold value computation block 900 shown in FIG. 26 that are corresponding to the high-frequency component transform means. It is also the vertical high-frequency transform block 404, oblique high-frequency transform block 406, horizontal high-frequency transform processing block 422 and high-frequency threshold value computation block 451 shown in FIG. 18 that are corresponding to the high-frequency component transform means. It is the synthesis block 209 shown in FIG. 27 that is corresponding to the frequency synthesis means. It is the luminance/color difference separation block 911 shown in FIG. 26 that is corresponding to the frequency characteristics estimation means. It is the low-frequency extraction filters in the noise reduction processing means 104 and color difference noise reduction processing block 450 and the HPF filter setting block 221 and LPF filter setting block 222 for each high-frequency extraction filter, shown in FIGS. 26 and 27, that are corresponding to the frequency division characteristics setting means.

In the invention (12), the frequency division characteristics for the luminance signal differ from those for the color difference signal, so that the luminance signal, and the color difference signal can undergo transform processing in ways well fit for them.

The invention (13) is characterized in that said high-frequency component transform means in the invention (12) comprises a high-frequency component inhibition means for enhancing or inhibiting an element of said high-frequency components having a given range at a given high-frequency component, and a threshold value setting means for setting at least one threshold value that determines a given range.

The invention (13) is embodied in the form of the fourth embodiment shown in FIGS. 26 and 27. It is the horizontal/vertical high-frequency transform processing block 202, 45° oblique high-frequency transform processing block 204, 135° oblique high-frequency transform block 206 and residual high-frequency transform processing block 208 of FIG. 26 and the oblique high-frequency transform block 406, vertical high-frequency transform block 404 and horizontal high-frequency transform block 422 of FIG. 27 that are corresponding to the high-frequency component inhibition means for enhancing or inhibiting an element having a given range at a given high-frequency component. It is the high-frequency threshold value computation block 451 and residual high-frequency threshold value computation block 900 of FIG. 26 and the high-frequency threshold value computation block 451 of FIG. 27 that are corresponding to the threshold value setting means for setting at least one threshold value that determines a given range. With the invention (13), such threshold value processing as mentioned above can be implemented thereby deleting a noise component from the high-frequency components.

The invention (14) is characterized in that said frequency characteristics estimation means in the invention (12) makes an estimation of the frequency characteristics of signals corresponding to at least two color filters provided on the front surface of an imaging device for each pixel from information about what positions they are located in.

The invention (14) is embodied in the form of the fourth embodiment shown in FIG. 27. It is processing at the luminance/color difference separation block 911 that is corresponding to the estimation of the frequency characteristics of signals corresponding to at least two color filters provided on the front surface of an imaging device for each pixel from information about what positions they are located in. According to this arrangement, noise reduction processing can be implemented for a luminance signal (G) and a color difference signal (R-G, B-G) in ways well fit for them.

The invention (15) is characterized in that said frequency characteristics estimation means in the invention (12) makes an estimation of the frequency characteristics of a color signal from the type of said color signal.

The invention (15) is embodied in the form of the fourth embodiment shown in FIG. 27. It is processing at the luminance/color difference separation means 911 that is corresponding to the estimation of the frequency characteristics of a color signal from the type of said color signal. According to this arrangement, noise reduction processing may be implemented for the luminance signal and the color difference signal in frequency division ways well fit for them.

The invention (16) is characterized in that the frequency division characteristics setting means in the invention (12) sets a coefficient for at least one frequency division filter in the group of frequency division filters that form said frequency division means.

The invention (16) is embodied in the form of the fourth embodiment shown in FIGS. 26 and 27. That the low-frequency extraction block 200 of FIG. 26 is built up of a low-frequency extraction filter shown in FIG. 6, and this low-frequency extraction filter is set at the LPF filter coefficient setting block 222 shown in FIG. 2 is corresponding to the setting of a coefficient for at least one frequency division filter in the group of frequency division filters that form said frequency division means. The horizontal/vertical high-frequency extraction block 202, 45° oblique high-frequency extraction block 203 and 135° oblique high-frequency extraction block 205 is built up of the high-frequency extraction filters (H1 to H12) shown in FIG. 4, and the residual high-frequency extraction filter 207 is built up of the residual high-extraction filter shown in FIG. 8. That these high-frequency extraction filters and the residual high-frequency extraction filter are set at the HPF filter coefficient setting block shown in FIG. 2 is corresponding to the "setting a coefficient for at least one frequency division filter in the group of frequency division filters that form said frequency division means". That at the color difference noise reduction processing block 450 of FIG. 27, the low-frequency extraction filter at the low-frequency extraction block 200 and the high-frequency extraction filters at the respective high-frequency extraction blocks 403, 405 and 441-447 are set at the HPF filter coefficient setting block 221 and LPF filter coefficient setting block 222 at the noise parameter setting block 109 shown in FIG. 2 is corresponding to the "setting a coefficient for at least one frequency division filter in the group of frequency division filters that form said frequency division means". According to this arrangement, transform processing is applied to the respective high-frequency components extracted by the high-frequency extraction filters having given coefficients, whereby noises included in the respective high-frequency components can be reduced.

According to this invention, even when any frequency characteristics are adjusted, it is possible to prevent unexpected adjustment from being made of a specific frequency component. It is thus possible to prevent the occurrence of artifacts that are image or signal components that occurs unavoidably by signal processing. Depending on the quantity of noise, it is possible to prevent any possible unexpected adjustment of a specific frequency component: it is possible to prevent the occurrence of artifacts. The present invention can provide an image processor that upon image signal processing, changes the frequency separation characteristics for transform processing on the basis of frequency separation depending on changes in the frequency characteristics of a post processor, whereby image quality deteriorations can be prevented and a sensible tradeoff can be offered between proper noise reductions and maintaining the details of images.

BRIEF DESCRIPTION OF THE DRAWINGS

FIG. 3 is illustrative of the Bayer arrangement.

FIG. 4 is illustrative of one example of the high-frequency extraction filter.

FIG. 5 is illustrative of one example of the low-frequency extraction filter.

FIG. 6 is illustrative of another example of the low-frequency extraction filter.

FIG. 7 is illustrative of one example of the residual high-frequency extraction filter.

FIG. 8 is illustrative of another example of the residual high-frequency extraction filter.

FIG. 9 is illustrative of band-pass filter characteristics.

FIG. 16 is illustrative of one example of the high-frequency extraction filter.

FIG. 17 is illustrative of one example of the low-frequency extraction filter.

FIG. 20 is illustrative of one example of the high-frequency extraction filter.

BEST MODE FOR CARRYING OUT THE INVENTION

Figure 1:
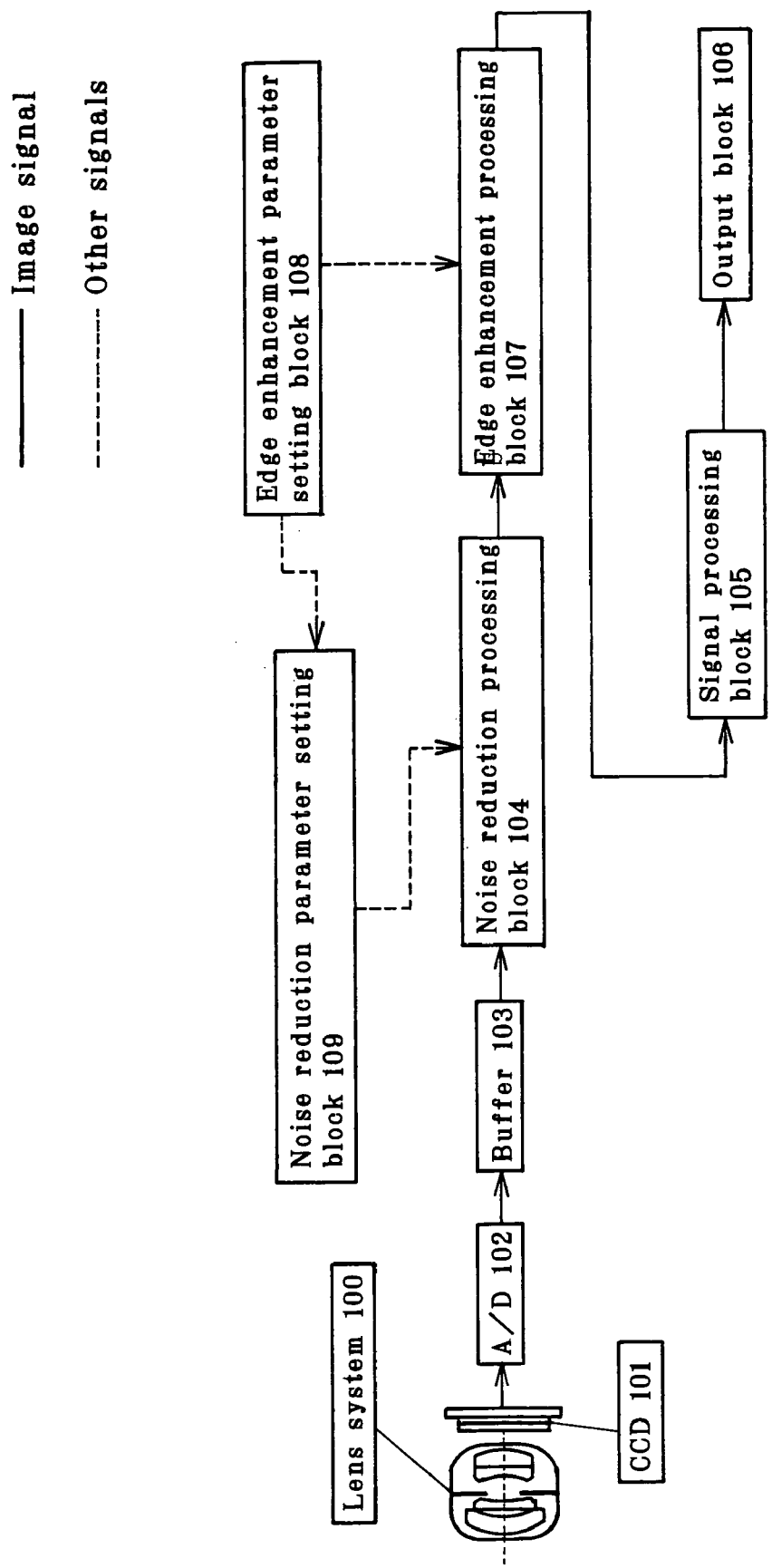
FIG. 1 is illustrative of the architecture of the first embodiment.
Figure 2:
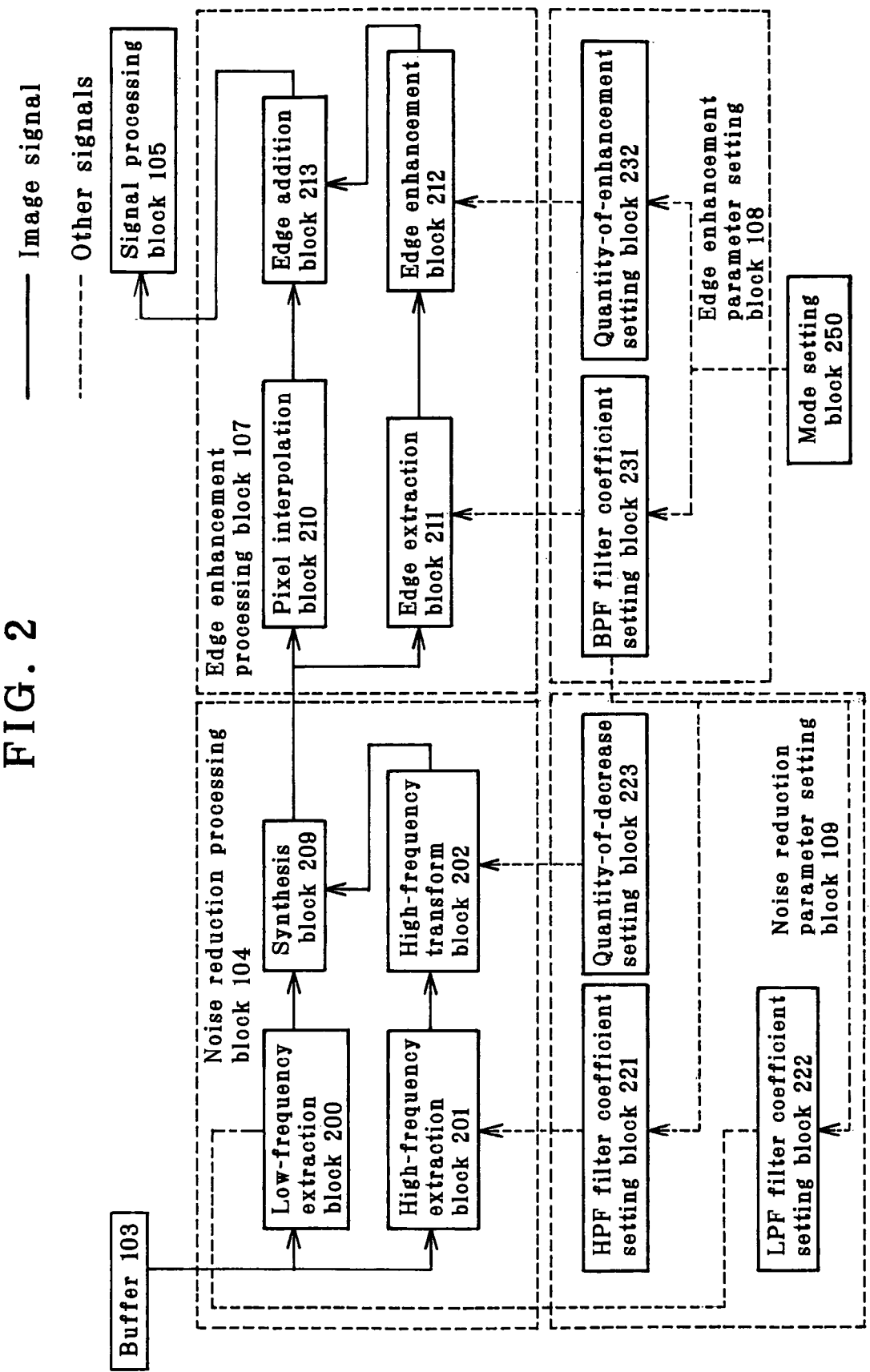
FIG. 2 is illustrative of the setup of a part of FIG. 1.
Figure 10:
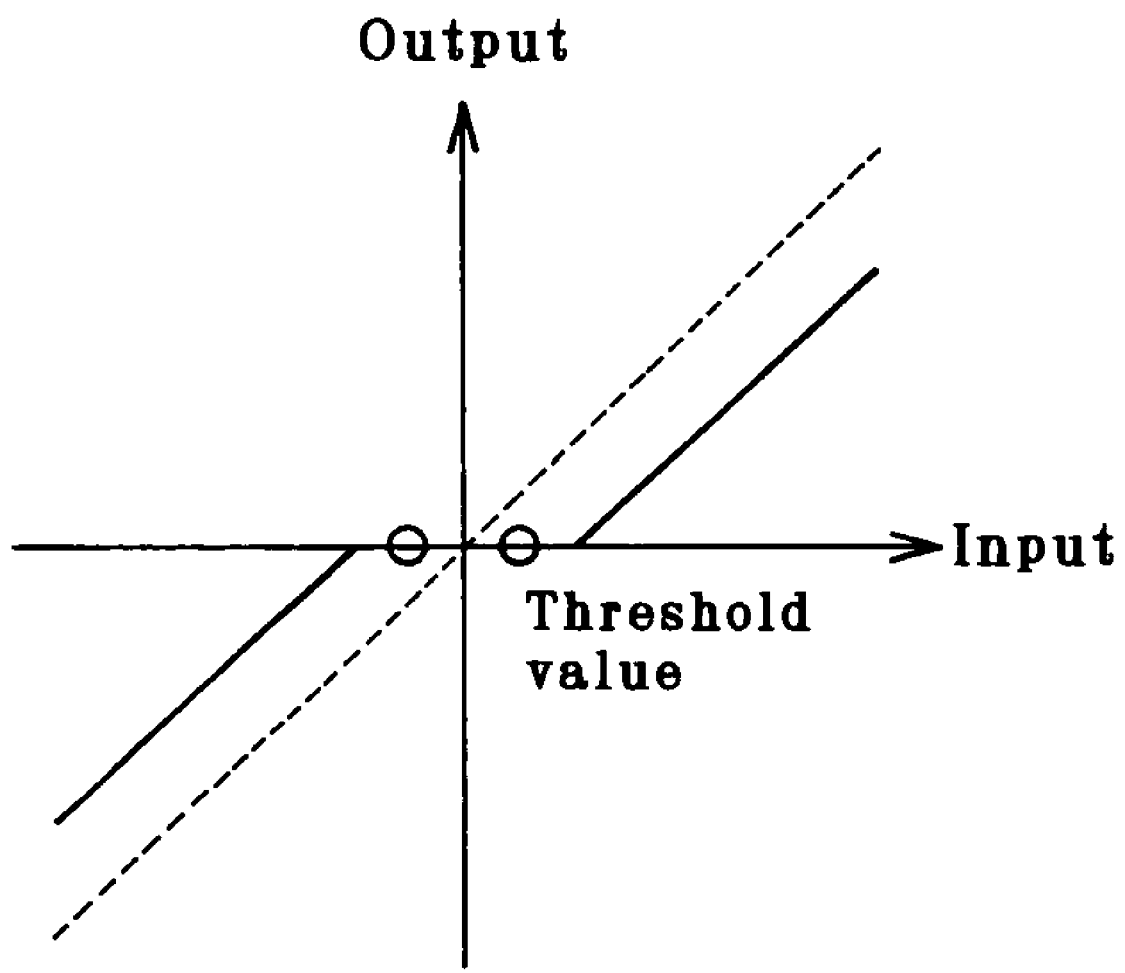
FIG. 10 is illustrative of the characteristics of one example of coring transform processing.

The first embodiment of the invention is now explained with reference to the drawings. FIGS. 1 to 10 are illustrative of the first embodiment. FIG. 1 is illustrative of the architecture of the first embodiment; FIG. 2 is illustrative of the setup of a part of FIG. 1; FIG. 3 is illustrative of the Bayer arrangement; FIG. 4 is illustrative of one example of the high-frequency extraction filter; FIG. 5 is illustrative of one example of the low-frequency extraction filter; FIG. 6 is illustrative of another example of the low-frequency extraction filter; FIG. 7 is illustrative of one example of the residual high-frequency extraction filter; FIG. 8 is illustrative of another example of the residual high-frequency extraction filter; FIG. 9 is a characteristics diagram illustrative of the relationship between the characteristics of a band-pass filter and a low-pass filter; and FIG. 10 is a characteristics diagram illustrative of one example of coring transform processing.

The first embodiment of the image processor based on the invention is assumed to be mounted on a digital camera for the purpose of achieving a function of taking images of subjects and recording the ensuing digital data in a recording medium. In FIG. 1, an image taken via a lens system 100 and CCD 101 is converted at an A/D 102 into digital signals that are in turn stored in a buffer 103. An output from the buffer 103 is entered in an output block 106 via a noise reduction processing block 104, an edge enhancement processing block 107 and a signal processing block 105 in this order.

Further, a control block built up of a microcomputer (not shown), etc. is bidirectionally connected to each block. An image signal read out of the buffer 103 is subjected at the noise reduction processing block 104 to noise reduction processing by which noise contained in the image signal is reduced, and then at the edge enhancement processing block 107 to edge enhancement processing. Further at the signal processing block 105, known signal processing such as color correction processing and compression processing is applied to the image signal that is then stored at the output block 106 in the recording medium. On the other hand, a noise reduction parameter setting block 109 is connected to the noise reduction block 104, and an edge enhancement parameter setting block 108 is connected to the edge enhancement processing block 107.

Noise reduction processing is implemented with an area comprising as the unit to be processed a Bayer arrangement of 5 pixels×5 pixels, like one shown in FIG. 3. Once noise reduction processing has been implemented, the signal of a G pixel at the center of the area in FIG. 3 is transformed. While the area is moved by two pixels, similar processing is repeatedly implemented so that noise reduction processing is applied to all over the image. Such noise reduction processing is implemented on the basis of control by the control block.

FIG. 2 is illustrative of the detailed setups of the noise reduction processing block 104, edge enhancement processing block 107, noise reduction parameter setting block 109, and edge enhancement parameter setting block 108 in FIG. 1. The noise reduction processing block 104 works separating an image signal read out of the buffer 103 into multiple frequency components, then applying transform processing to each of them, and finally re-synthesizing them for noise reduction. The frequency separation here is implemented by a high-frequency extraction filter having directionality.

A low-frequency extraction block 200 applies the low-frequency filter depicted in FIG. 5 or 6 to the image signal read out of the buffer 103 to extract a low-frequency component. The low-frequency extraction filter is set at an LPF filter coefficient setting block 222. A low-frequency component extracted at the low-frequency extraction block 200 is forwarded to a synthesis block 209. A high-frequency extraction block 201 applies high-frequency extraction filters (H1 to H12) depicted in FIG. 4 and a residual high-frequency extraction filter depicted in FIG. 7 or 8 to an image signal read out of the buffer 103 to extract 13 kinds of high-frequency components.

The high-frequency extraction filters (H1 to H12) and the residual high-frequency extraction filter are set by an HPF filter coefficient setting block 221. FIG. 4 is illustrative of the high-frequency extraction filters (H1 to H12) with (a) extracting a 45° oblique high-frequency component, (b) a 135° oblique high-frequency component, and (c) horizontal/vertical high-frequency components. A 45° oblique high-frequency extraction filter is built up of the first, second, third and fourth high-frequency extraction filters (H1 to H4); a 135° oblique high-frequency extraction filter is built up of the first, second, third and fourth high-frequency extraction filters (H5 to H8); and a horizontal/vertical frequency component extraction filter is built up of the first, second, third and fourth high-frequency extraction filters (H9 to H12). Note here that 1/16 is the divisor for level adjustment subjected to bit shift computation. As shown in FIGS. 4(a), 4(b) and 4(c), the high-frequency extraction block 201 of FIG. 2 extracts high-frequency components of directionality in the 45° oblique direction, 135° oblique direction, and horizontal and vertical directions.

The residual high-frequency component is the remnants of the original signal from which the low-frequency component, the horizontal/vertical high-frequency components, the 45° oblique high-frequency component and the 135° oblique high-frequency component are extracted. The residual high-frequency extraction filter depicted in FIG. 7 or 8 is provided to synthesize together all the components from the low-frequency component to the horizontal/vertical high-frequency components, to the 45° oblique high-frequency component and to the 135° oblique high-frequency component, thereby reconstructing the original signal impeccably. Accordingly, the residual high-frequency filter of FIG. 7 is used in combination with the LPF of FIG. 5, and the residual high-frequency filter of FIG. 8 is used in combination with the LPF of FIG. 6.

A high-frequency transform block 202 works applying transform processing to each of the extracted high-frequency components, thereby reducing noise contained in each high-frequency component. At the high-frequency transform block 202, such coring transform processing shown in FIG. 10 is implemented. In FIG. 10, an encircled area stands for a component whose amplitude is smaller in absolute value than the threshold value. At the high-frequency transform block 202, the coring transform processing of FIG. 10 is implemented to delete an encircled component whose amplitude is smaller than the threshold value out of each high-frequency component, thereby reducing noise. The high-frequency component reduced in noise is synthesized at the synthesis block 209 with other components.

The edge enhancement processing block 107 works extracting an edge component and the low-frequency component out of the image signal to which noise reduction processing has been applied, optionally with the application of transform processing to the edge component, and then adding and mixing them to the low-frequency component, thereby adjusting the sharpness of the image signal. A pixel interpolation block 210 works applying a low-pass filter to the signal of the G pixel at the processing block depicted in FIG. 3, whereby the low-frequency component is extracted. By this processing, the G component at an R/B pixel at the processing block shown in FIG. 3 is created. An edge extraction block 211 works applying a band-pass filter to the signal of the G pixel at the processing block depicted in FIG. 3, whereby the edge component is extracted.

An edge enhancement block 212 works multiplying the edge component by a coefficient, whereby transform processing is applied to the edge component. At an edge addition block 213, the edge component to which transform processing has been applied at the edge enhancement block 212 and the low-frequency component extracted at the pixel interpolation block 210 are synthesized together into an image signal with an enhanced edge. Sharpness is adjusted by changing an enhancement coefficient given from an enhancement quantity setting block 232 to the edge enhancement block 212 or changing a band-pass filter coefficient given from a BPF filter coefficient setting block 231 to the edge extraction block 211. The changing of such coefficients is implemented depending on the mode setting at a mode setting block 250. Depending on the edge enhancement mode setting, the band-pass filter coefficient is selected such that the band-pass filter characteristics at the edge extraction block 211 turn into BPF1 as shown in FIG. 9(a) or BPF 2 as shown in FIG. 9(b).

As the band-pass filter at the edge extraction block 211 is selected, so is the low-frequency extraction filter at the low-frequency extraction block 200 in the noise reduction processing block 104. A low-frequency extraction filter 1 depicted in FIG. 5 is set for the characteristics of the edge extraction filter BPF1, while a low-frequency extraction filter 2 depicted in FIG. 6 is set for the characteristics of the edge extraction filter BPF2. The low-frequency extraction filter 1 depicted in FIG. 5 has the characteristics of LPF1 of FIG. 9(a) and the low-frequency extraction filter 2 depicted in FIG. 6 has the characteristics of LPF2 of FIG. 9(b).

Further, as the low-frequency extraction filter at the low-frequency extraction block 200 is selected, so is the residual high-frequency extraction filter at the high-frequency extraction block 201. The residual high-frequency extraction filter 1 depicted in FIG. 7 is set for the low-frequency extraction filter 1 depicted in FIG. 5, and the residual high-frequency extraction filter 2 depicted in FIG. 8 is set for the extraction filter 2 depicted in FIG. 6.

The output of the low-frequency extraction block 200 in the noise reduction processing block 104 is entered as such in the edge enhancement processing block 107; as shown in FIG. 9, there is an overlap between the frequency characteristics of the low-frequency extraction filter at the noise reduction processing block 104 and the frequency characteristics of the band-pass filter at the edge enhancement processing block 107. The frequency of such an overlap would be more enhanced. As there is a noise component remaining at a frequency area having an overlap of frequency characteristics, it causes the noise component to be more enhanced, giving rise to image quality deterioration.

On the other hand, the characteristics of the band-pass filter at the edge enhancement processing block 107 are individually adjusted in such a way as to obtain the desired sharpness; the relationship between the frequency characteristics of the noise reduction processing block 104 and the frequency characteristics of the band-pass filter at the edge enhancement processing block 107 is equivocal.

Therefore, when the frequency characteristics of the band-pass filter at the edge enhancement processing block 107 is changed depending on the adjustment of sharpness, so is the frequency characteristics of the low-frequency extraction filter at the noise reduction processing block 104. This makes the frequency characteristics of the low-frequency extraction filter at the noise reduction processing block 104 less likely to overlap those of the band-pass filter at the edge enhancement processing block 107 so that any image quality deterioration due to the enhancement of the remaining noise component can be prevented.

Figure 11:
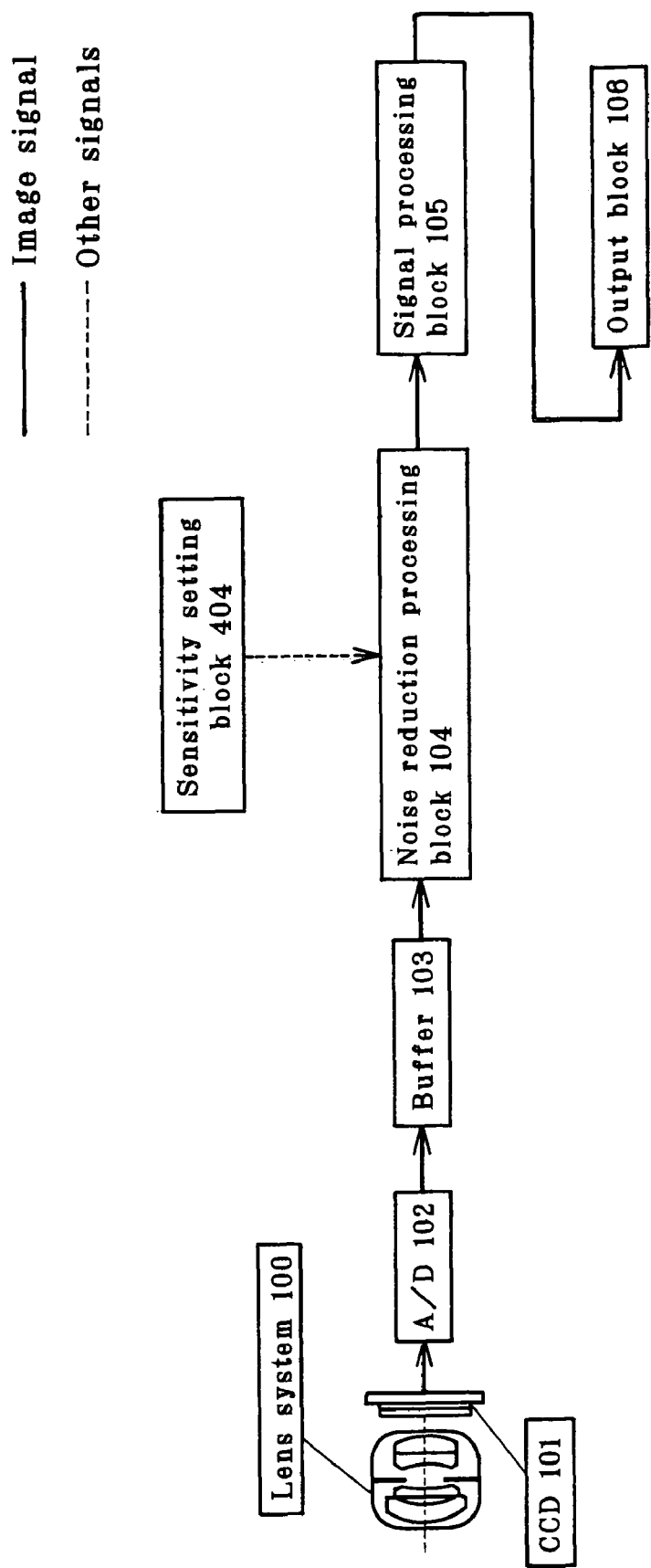
FIG. 11 is illustrative of the architecture of the second embodiment.
Figure 12:
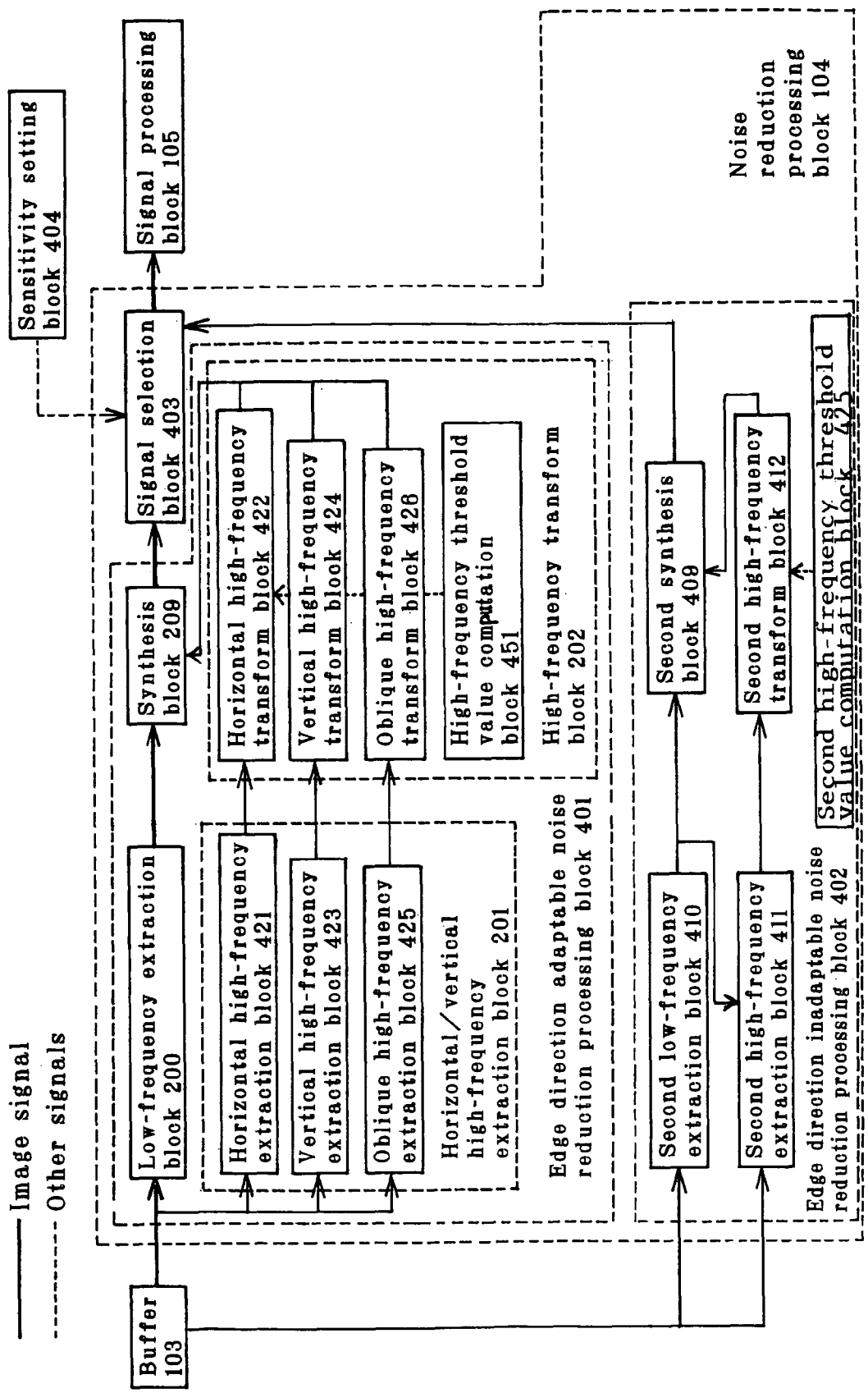
FIG. 12 is illustrative of the setup of a part of FIG. 11.
Figure 13:
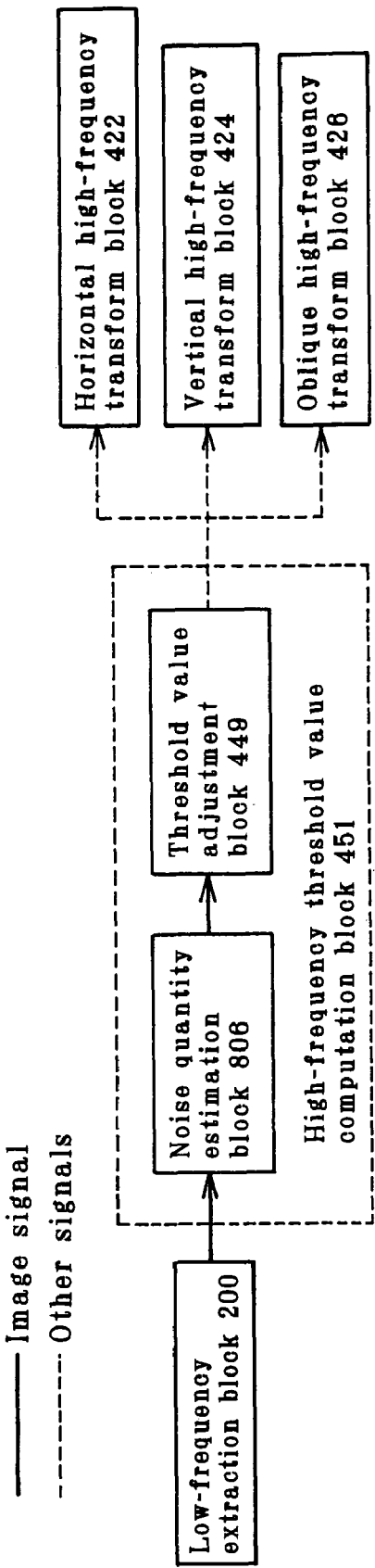
FIG. 13 is illustrative of the setup of a part of FIG. 12.
Figure 14:
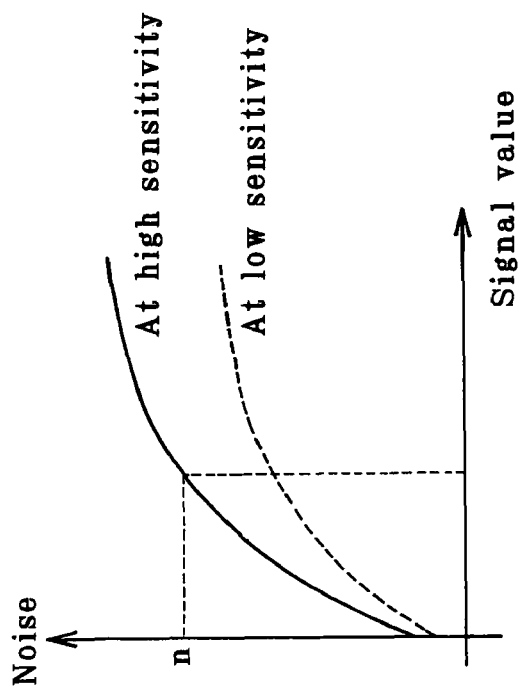
FIG. 14 is a characteristics diagram illustrative of one exemplary noise model.
Figure 15:
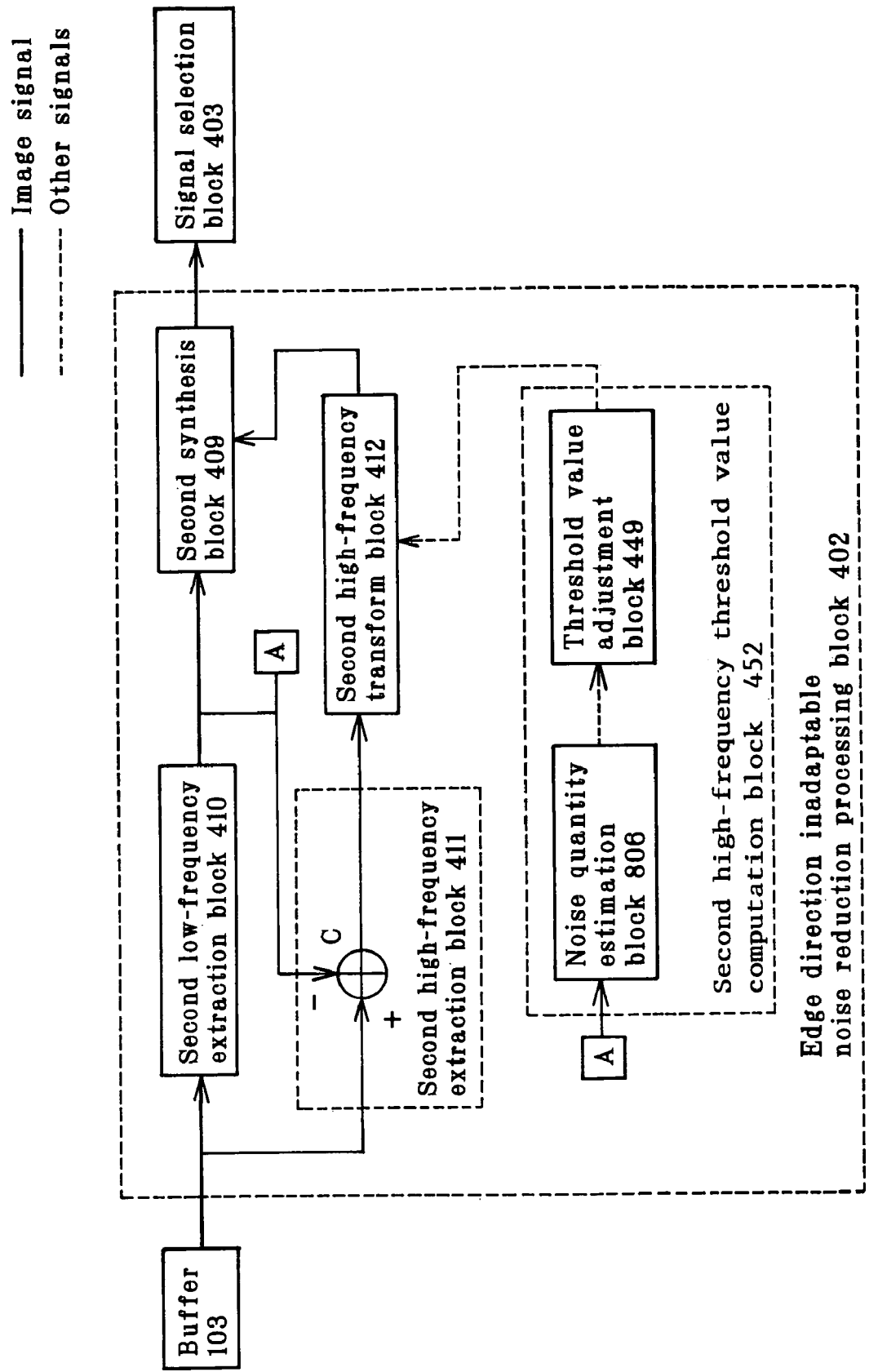
FIG. 15 is illustrative of the setup of a part of FIG. 12.
Figure 18:
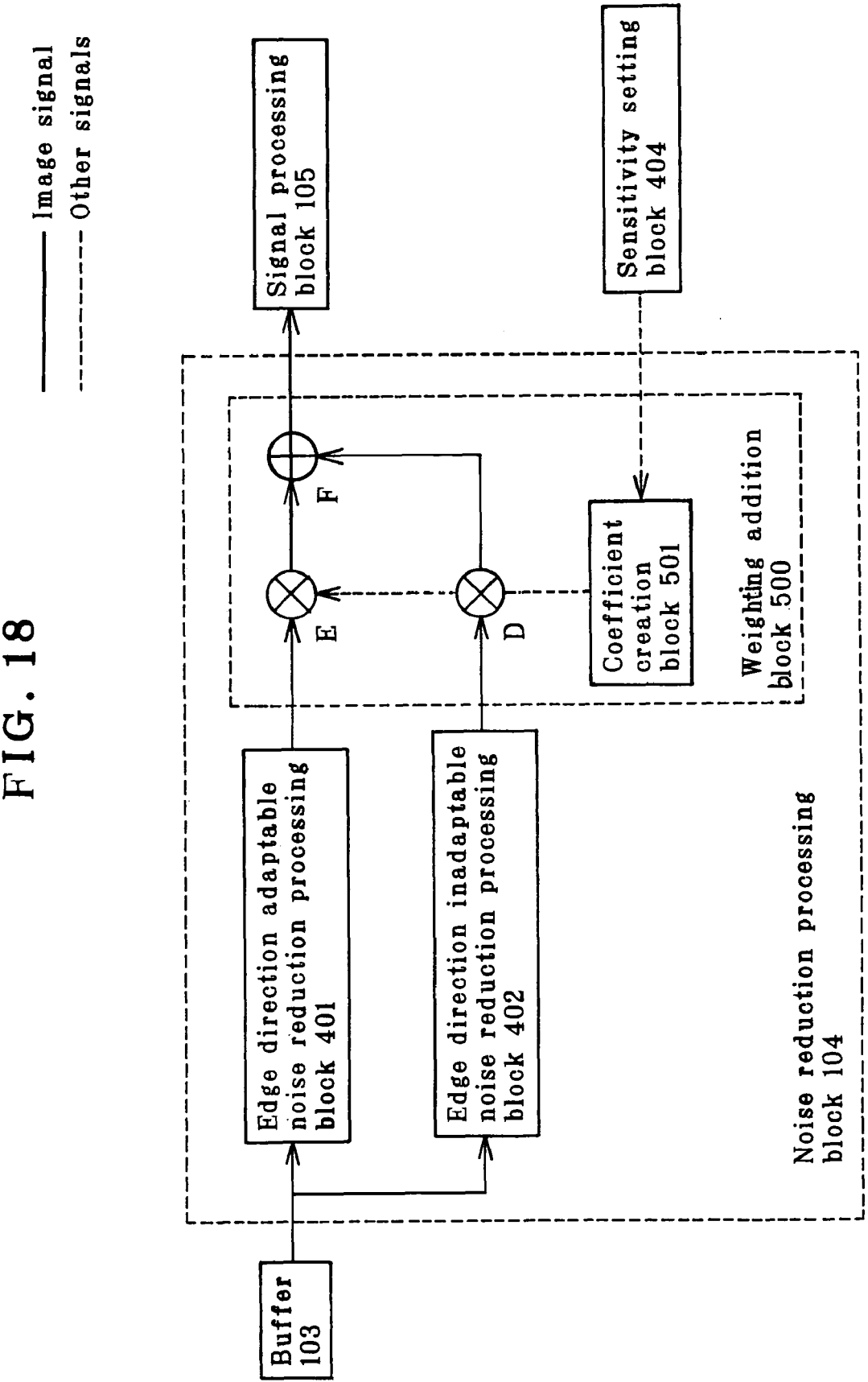
FIG. 18 is illustrative of the architecture of a modification to FIG. 12.

FIGS. 11 to 18 are illustrative of the second embodiment of the invention. FIG. 11 is illustrative of the architecture of the second embodiment; FIG. 12 is illustrative of the setup of a part of FIG. 11; FIG. 13 is illustrative of the setup of a part of FIG. 12; FIG. 14 is a characteristics view illustrative of one exemplary noise model; FIG. 15 is illustrative of the setup of a part of FIG. 12; FIG. 16 is illustrative of one example of the high-frequency extraction filter; FIG. 17 is illustrative of one example of the low-frequency extraction filter; and FIG. 18 is illustrative of the setup of a modification to FIG. 12. Note here that both the view illustrative of the Bayer arrangement of FIG. 3 explained with reference to the first embodiment and the characteristics view illustrative of one exemplary coring transform processing of FIG. 10 are applied to the second embodiment, too.

FIG. 11 is illustrative of the image processor according to the second embodiment of the invention. This second embodiment of the invention is assumed to be mounted on a digital camera for the purpose of achieving a function of taking images of subjects and recording the ensuing digital data in a recording medium. An image taken via a lens system 100 and CCD 101 is converted at an A/D 102 into digital signals that are in turn stored in a buffer 103. An output from the buffer 103 is entered in an output block 106 via a noise reduction processing block 104, and a signal processing block 105 in this order.

Further, a control block built up of a microcomputer (not shown), etc. is bidirectionally connected to each block. An image signal read out of the buffer 103 is subjected at the noise reduction processing block 104 to noise reduction processing by which noise contained in the image signal is reduced, and then at the signal processing block 105, known signal processing such as color correction processing and compression processing is applied to the image signal that is then stored at the output block 106 in the recording medium. A sensitivity setting block 404 is connected to the noise reduction block 104.

As explained with reference to the first embodiment of the invention, noise reduction processing at the noise reduction processing block 104 is implemented with an area comprising as the unit to be processed a Bayer arrangement of 5 pixels×5 pixels like one shown in FIG. 3. Once noise reduction processing has been implemented, the signal of a G pixel at the center of the area in FIG. 3 is transformed. While the area is moved by two pixels, similar processing is repeatedly implemented so that noise reduction processing is applied to all over the image. Such noise reduction processing is implemented on the basis of control by the control block.

FIG. 12 is illustrative of the detailed setups of the noise reduction processing block 104. The noise reduction processing block 104 is built up of an edge direction adaptable noise reduction processing block 401, an edge direction inadaptable noise reduction processing block 402, and a signal selection block 403 connected to the respective outputs of the edge direction adaptable noise reduction processing block 401 and the edge direction inadaptable noise reduction processing block 402. The edge direction adaptable noise reduction processing block 401 works separating an image signal read out of the buffer 103 into multiple frequency components, then applying transform processing to each of them and finally re-synthesizing them for noise reduction. The frequency separation here is implemented by a high-frequency extraction filter of directionality. The noise reduction processing achieved at the edge direction adaptable noise reduction processing block 401 has the feature of well separating the original structure included in the image signal from the noise components, because the image signal is separated into multiple high-frequency components and noise reduction processing is applied to each separated component.

A low-frequency extraction block 200 works applying the low-frequency filter depicted in FIG. 17 to the image signal read out of the buffer 103 to extract a low-frequency component. The extracted low-frequency component is sent out to a synthesis block 209. A high-frequency extraction block 201 is built up of a horizontal high-frequency extraction block 421, a vertical high-frequency extraction block 423 and an oblique high-frequency component extraction block 425. The high-frequency extraction block 201 works applying high-frequency extraction filters (H1 to H12) depicted in FIG. 16 to an image signal read out of the buffer 103 to extract 12 kinds of high-frequency components.

A high-frequency transform block 202 comprises a horizontal high-frequency transform block 422, a vertical high-frequency transform block 424 and an oblique high-frequency transform block 426. The high-frequency transform block 202 works applying transform processing to the respective high-frequency components extracted at the horizontal high-frequency extraction block 421, vertical high-frequency extraction block 423 and oblique high-frequency extraction block 425, thereby reducing noise included in each high-frequency component.

In the high-frequency extraction filters (H1 to H12) of FIG. 16, (a) extracts the horizontal high-frequency component, (b) the vertical high-frequency component, and (c) the oblique high-frequency component. In FIG. 16, the horizontal high-frequency extraction filer, for instance, comprises the first, second, third and fourth high-frequency filters (H1 to H4), as explained with reference to FIG. 6. Likewise, the vertical high-frequency extraction filter comprises the first, second, third and fourth high-frequency extraction filters (H5 to H8), and the oblique high-frequency extraction filter comprises the first, second, third and fourth high-frequency extraction filters (H9 to H12). Thus, the high-frequency extraction filter works extracting the horizontal, vertical and oblique high frequencies of directionality.

At the high-frequency transform block 202, such coring transform processing as already mentioned and shown in FIG. 10 is implemented. By deleting a component whose amplitude is smaller than the threshold value (encircled areas in FIG. 10) out of the respective high-frequency components, there is noise reduced. A high-frequency threshold value computation block 451 works determining the threshold value used for transform processing. The high-frequency components with reduced noise are synthesized at a synthesis block 209 with other components.

As shown in FIG. 13, the high-frequency threshold value computation block 451 is built up of a noise quantity estimation block 806 and a threshold value adjustment block 449. The noise quantity estimation block 806 uses a noise model as depicted in FIG. 14 and a low-frequency component obtained at the low-frequency extraction block 200 to find out the quantity of noise estimated to be included in the high-frequency components. The noise model of FIG. 14 is predetermined by theoretical computation or actual measurement, with a solid line and a broken line standing for characteristics at high and low sensitivities, respectively. The threshold value adjustment block 449 works multiplying the noise quantity found out at the noise quantity estimation block 806 by an adjustment value. Being a value for adjusting the strength of transform processing taking place at the horizontal high-frequency transform 422, vertical high-frequency transform block 424 and oblique high-frequency transform block 426, that value is predetermined by previous adjustment operation.

The edge direction inadaptable noise reduction processing block 402 of FIG. 15 works separating the image signal read out of the buffer 103 into a low-frequency component and a high-frequency component at a second low-frequency extraction block 410 and a second high-frequency extraction block 411. A low-frequency component (A) extracted at the second low-frequency extraction block 410 is entered in a second high-frequency threshold computation block 452, and a low-frequency component extracted at the second low-frequency extraction block 410 is reversed in sign and then synthesized at an adder C in the second high-frequency extraction block 411 with the image signal read out of the buffer 103. Consequently, the high-frequency components included in the image signal are extracted.

As is the case with the high-frequency threshold computation block 451 explained with reference to FIG. 13, the second high-frequency threshold value computation block 452 is built up of a noise quantity estimation block 806 and a threshold value adjustment block 449. The output of the second high-frequency threshold value computation block 452 is entered in the second high-frequency transform block 412 to adjust the strength of transform processing to be applied to the high-frequency component extracted at the second high-frequency extraction block 411. After subjected to transform processing at the second high-frequency transform block 412, the high-frequency component is re-synthesized at the second synthesis block 409 with the low-frequency component extracted at the second low-frequency extraction block 410 for noise reduction. The output of the second synthesis block 409 is entered in the signal selection block 403.

The second low-frequency extraction block 410 of FIG. 12 works applying the low-frequency extraction filter of FIG. 17 to an image signal read out of the buffer 103 to extract the low-frequency component. The low-frequency component extracted by the low-frequency extraction filter is sent out to the second synthesis block 409. The second high-frequency extraction block 411 is built up of a subtracter, and subtracts the low-frequency component from the image signal read out of the buffer 103, thereby extracting the high-frequency components. The second high-frequency transform block 412 works applying transform processing to the high-frequency component extracted at the second high-frequency extraction block 411, thereby reducing noise included in the high-frequency component.

At the second high-frequency transform block 412, such coring processing as shown in FIG. 10 takes place. That is, by deleting a component whose amplitude is smaller than the threshold value out of the high-frequency component, there is noise reduced at the second high-frequency transform block 412. The second high-frequency threshold value computation block 452 determines the threshold value used for transform processing. The high-frequency component whose noise is reduced at the second high-frequency transform processing block 412 is synthesized at the second synthesis block 409 with the low-frequency component extracted at the second low-frequency extraction block 410. The second high-frequency threshold value computation block 452 is the same in setup as, but differs in the noise model and adjustment value from, the high-frequency threshold value computation block 451.

The signal selection block 403 uses as an input the output of the edge direction adaptable noise reduction processing block 401 and the output of the edge direction inadaptable noise reduction processing block 402 to, depending on the photographic sensitivity set at the sensitivity setting block 404, select either one of the signals and send it out to the signal processing block 105. With the photographic sensitivity higher than the pre-determined one, the signal selection block 403 works selecting the output of the edge direction inadaptable noise reduction processing block 402 and sending it out to the signal processing block 105.

At the sensitivity setting block 404, photographic sensitivity is set on the basis of at least one piece of information about the temperature of the imaging device, gain with respect to the input signal, or the shutter speed at the time of taking images. The sensitivity setting block 404 further comprises a gain computation means for finding out said gain on the basis of at least one or more pieces of information about ISO sensitivity, exposure information, and white balance information.

When the photographic sensitivity is high, the noise included in the image signal increases; within such a small processing block area as shown in FIG. 3, there is difficulty in telling the original structure included in the image signal from a structure accidentally caused by the noise component, in which case a part of the noise component is not reduced and stays as it stands, giving rise to an artifact leading to image quality deteriorations. As a result, when the photographic sensitivity is high, the noise reduction processing achieved by the edge direction inadaptable noise reduction processing block 402 is preferable over the one achieved by the edge direction adaptable noise reduction processing block 402.

Therefore, when the photographic sensitivity is low, the output of the edge direction adaptable noise reduction processing block 401 is supposed to be the output of the noise reduction processing block 104. When the photographic sensitivity is high and the quantity of noise included in the image signal is large, the output of the edge direction inadaptable noise reduction processing block 402 is supposed to be the output of the noise reduction processing block 104. Thus, depending on the photographic sensitivity, the signal selection block 403 selects the output of the edge direction adaptable noise reduction processing block 401 or the edge direction inadaptable reduction processing block 402 to send it out to the signal processing block 105.

Thus, noise reduction processing is controlled depending on the photographic sensitivity: when the photographic sensitivity is low, the original structure included in the image signal is so separated from the noise component that the noise is effectively reduced, offering a tradeoff between sharpness improvements and noise reductions. When the photographic sensitivity is high, on the other hand, artifacts are effectively staved off. It is here noted that if, in place of the signal selection block 403, such a weighting addition block 500 as shown in FIG. 18 is provided, control could then be implemented such that there is an increase in the weight of the output of the edge direction inadaptable noise reduction processing block 402 with an increase in the photographic sensitivity.

The weighting addition block 500 of FIG. 18 is built up of multipliers D, E and an adder F. A coefficient creation block 501 determines a weighting coefficient for the output of the edge direction adaptable noise reduction processing block 401 depending on the photographic sensitivity set at the sensitivity setting block 404, and applies it to the multiplier E, thereby determining a weight coefficient for the output of the edge direction inadaptable noise reduction processing block 402 and applying it to the multiplier D. The multiplier E then works multiplying the output of the edge direction adaptable noise reduction processing block 401 by a weight coefficient for the output of the edge direction adaptable noise reduction processing block 401, and sending it out to the adder F. On the other hand, the multiplier D works multiplying the output of the edge direction inadaptable noise reduction processing block 402 by a weight coefficient for the output of the edge direction inadaptable noise reduction processing block 402, and sending it out to the adder F. In turn, the adder F adds up the output, weighed with the coefficient determined by the coefficient creation block 501, of the edge direction adaptable noise reduction processing block 401 and the output of the edge direction inadaptable noise reduction processing block 402, and sending the sum out to the signal processing block 105. In the embodiment as mentioned above, the selection of signals at the signal selection block 403 and the weighting addition processing of the signal at the weighting addition block 500 are implemented depending on the photographic sensitivity set at the sensitivity setting block 404. Desirously, such signal selection and weighting addition processing should be implemented depending on the quantity of noise included in the image signal. In other words, the selection of signals at the signal selection block 403, and the weighting addition processing of the signal at the weighting addition block 500 may as well be implemented on the basis of the estimated noise quantity produced out of the noise estimation block 806 in place of the photographic sensitivity set at the sensitivity setting block 404.

Figure 19:
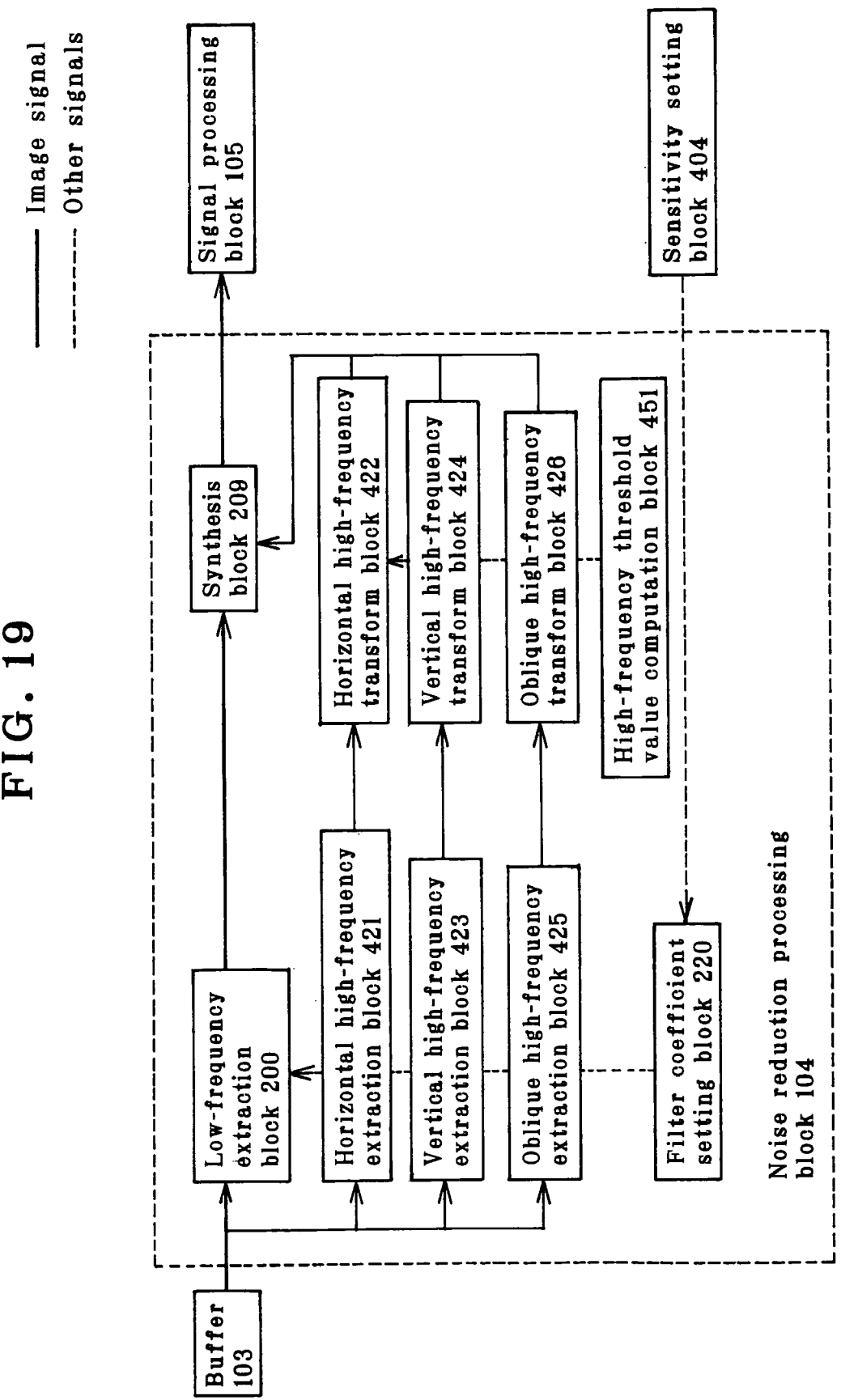
FIG. 19 is illustrative of the architecture of the third embodiment.
Figure 21:
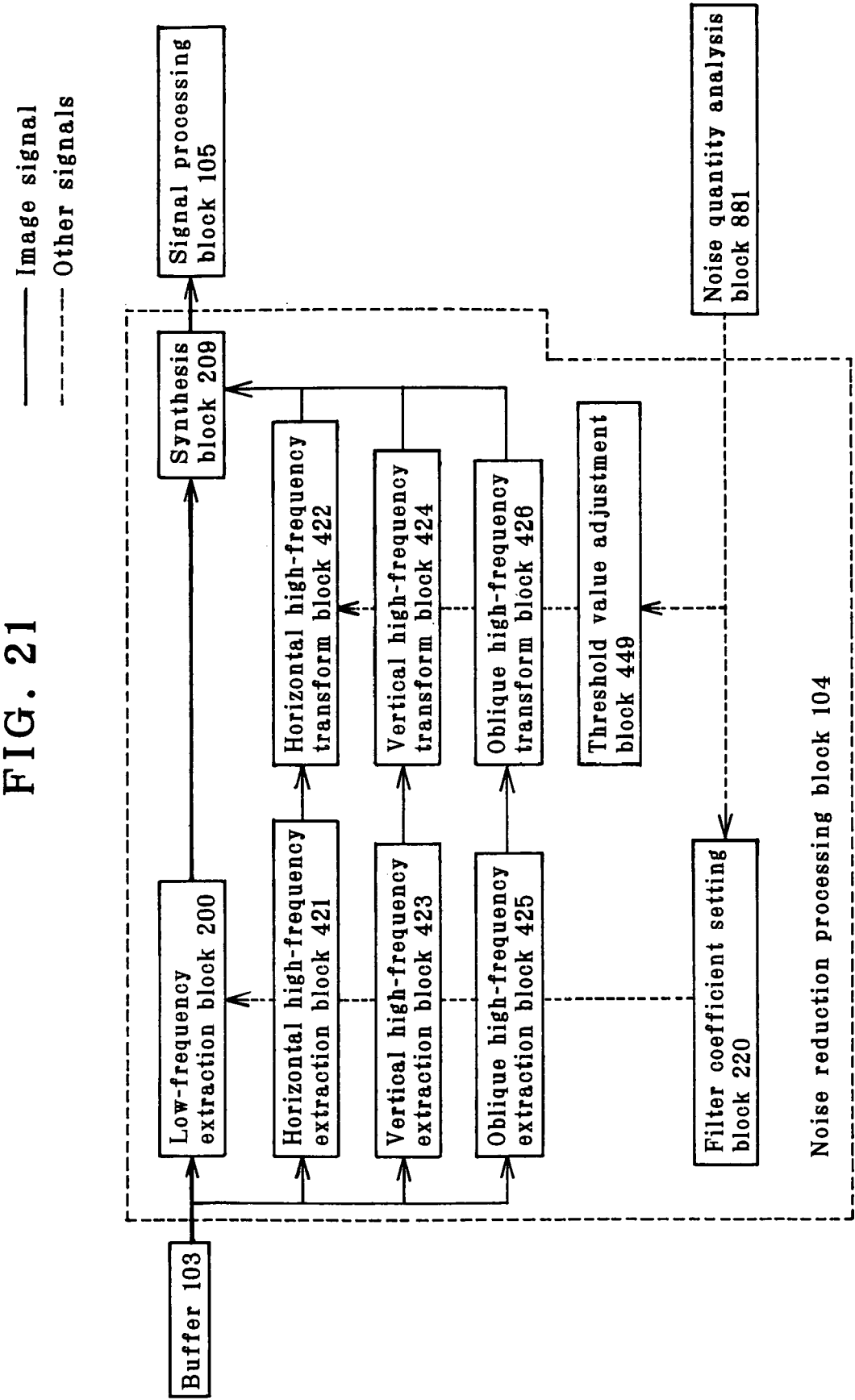
FIG. 21 is illustrative of the architecture of a modification to the third embodiment.
Figure 22:
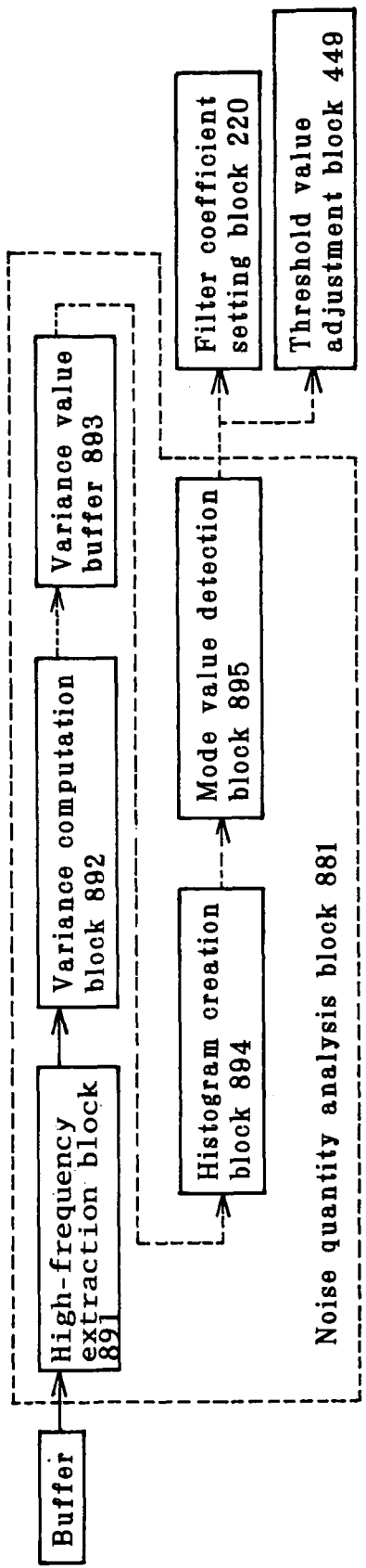
FIG. 22 is illustrative of the setup of a part of FIG. 21.
Figure 24:
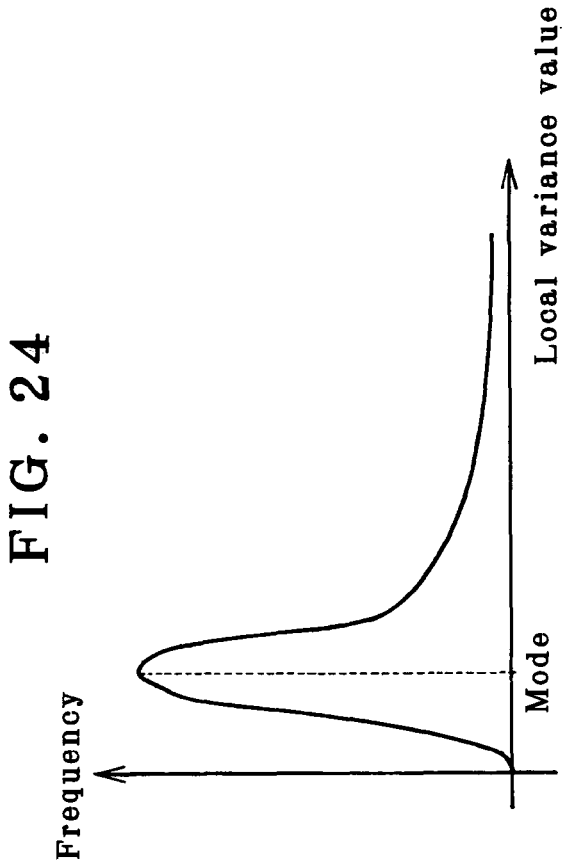
FIG. 24 is a characteristics diagram illustrative of one exemplary local variance value.
Figure 23:
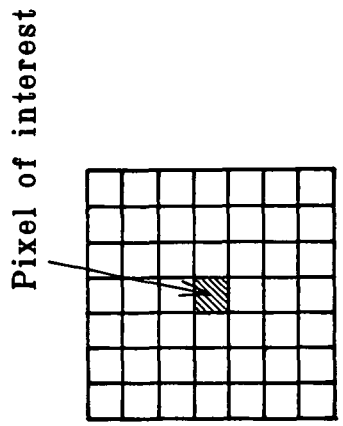
FIG. 23 is illustrative of one exemplar pixel arrangement.

FIGS. 19 to 24 are illustrative of the third embodiment of the invention. FIG. 19 is illustrative of the architecture of the third embodiment; FIG. 20 is illustrative of one example of the high-frequency extraction filter; FIG. 21 is illustrative of the architecture of a modification to the third embodiment; FIG. 22 is illustrative of the setup of a part of FIG. 21; FIG. 23 is illustrative of one exemplary pixel arrangement; and FIG. 24 is a characteristics view illustrative of one exemplary local variance value. Note here that FIG. 12 illustrative of the example of the high-frequency extraction filter of FIG. 16 as mentioned with reference to the second embodiment and FIG. 16 illustrative of the example of the low-frequency extraction filter explained with reference to FIG. 17, too, are equally applied to the third embodiment.

In the second embodiment, as shown in the architecture of FIG. 12, there are two noise reduction processing blocks differing in how to separate the frequency provided, i.e., the edge direction adaptable noise reduction processing block 401 and the edge direction inadaptable noise reduction processing block 402, and the signal selection block 403 works selecting either one of the respective outputs, and sending it out to the signal processing block. In the third embodiment, however, two noise reduction processing blocks, i.e., the edge direction adaptable noise reduction processing block 401 and the edge direction inadaptable noise reduction processing block 402 are dispensed with and, instead, a selection is made from among filter coefficients to select the noise reduction processing to be implemented.

In the embodiment here, there is a noise reduction block 104 provided, that is the same in setup as the edge direction adaptable noise reduction processing block 401 of FIG. 12, as shown in FIG. 19. In FIG. 19, a filter coefficient setting block 220 works applying to a horizontal high-frequency extraction block 421, a vertical high-frequency extraction block 423 and an oblique high-frequency extraction block 425 an extraction filter coefficient differing depending on the photographic sensitivity at a sensitive setting block 404.

In FIG. 19, at the filter coefficient setting block 220 on the basis of the photographic sensitivity set at a sensitivity setting block 404, the extraction filter coefficient applied to each high-frequency component is changed to make a changeover between edge direction adaptable noise reduction processing and edge direction inadaptable noise reduction processing. When the photographic sensitivity is lower than the predetermined one, the filter coefficient shown in FIG. 16 (the high-frequency extraction filter), and FIG. 17 (the low-frequency extraction filter) is set thereby implementing edge direction adaptable noise reduction processing. When the photographic sensitivity is higher than the pre-determined one, on the other hand, the filter coefficient shown in FIG. 20 (the high-frequency extraction filter), and FIG. 17 (the low-frequency extraction filter) is set, thereby implementing edge direction inadaptable noise reduction processing.

As in FIG. 16, FIG. 20 here is illustrative of an extraction filter set at each high-frequency extraction block. When the photographic sensitivity is higher than the predetermined one, edge direction inadaptable noise reduction processing is preferentially implemented. To this end, only the first horizontal high-frequency extraction filter (H1) is used as the high-frequency extraction filter with the coefficient of zero applied to all other ones (H2 to H12). As a result, high-frequency components in every direction are extracted by the first horizontal high-frequency extraction filter, and edge direction inadaptable noise reduction processing is implemented.

FIG. 21 is illustrative of one modification to the third embodiment. In the third embodiment shown in FIG. 19, the extraction filter coefficient set at the low-frequency extraction block 200, and each high-frequency extraction block 421, 422, 423, 424, 425) is changed depending on the photographic sensitivity at the sensitivity setting block 404. In the modification shown in FIG. 21, the quantity of noise included in the image signal is estimated, and the extraction filter coefficient is changed on the basis of the estimated noise quantity. As shown in FIG. 21, a noise quantity analysis block 881 is provided instead of the sensitivity setting block 404 of FIG. 19 for setting the photographic sensitivity.

The noise quantity analysis block 881 is shown in FIG. 22. At a high-frequency extraction block 891, a high-frequency component is extracted out of the image signal by means of a filter indicated at H1 of the high-frequency extraction filter of FIG. 20. A variance computation block 892 figures out a local variance value at neighbor pixels n×n around the pixel of interest. The local variance value is worked out by dividing the sum of squares of high-frequency components at neighbor pixels n×n around the pixel of interest shown in FIG. 23 by the square of n. Local variance values are worked out for high-frequency components corresponding to all pixels of an input image, and temporarily stored in a variance value buffer 893.

A histogram creation block 894 creates a local variance value histogram on the basis of the local variance values in the variance value buffer 893. A mode detection block 895 determines the most frequent local variance value from the local variance value histogram, as shown in the characteristics view of FIG. 24, producing the then local variance value as the estimation value for the quantity of noise included in the image signal. A filter coefficient setting block 220 changes the extraction filter coefficients set at a low-frequency extraction block 200 and each high-frequency extraction block (421, 422, 423, 423, 425) on the basis of the estimated noise quantity, as explained with reference to FIG. 21.

When the estimated value for the quantity of noise is smaller than the predetermined one, the filter coefficient shown in FIG. 16 (the high-frequency extraction filter), and FIG. 17 (the low-frequency extraction filter) is set thereby implementing edge direction adaptable noise reduction processing. When the estimated value for the quantity of noise is higher than the predetermined sensitivity, on the other hand, the filter coefficient shown in FIG. 20 (the high-frequency extraction filter), and FIG. 17 (the low-frequency extraction filter) is set thereby implementing edge direction inadaptable noise reduction processing. The estimated value for the quantity of noise is also given a threshold value adjustment block 449 so that it is also used as the basis of the threshold value for transform processing of each high-frequency component.

In the modification here, by way of illustration but not by way of limitation, the local variance value found by processing at the variance computation block 892 is applied to the computation from the image signal of the estimated value of the quantity of noise included in the image signal.

Figure 25:
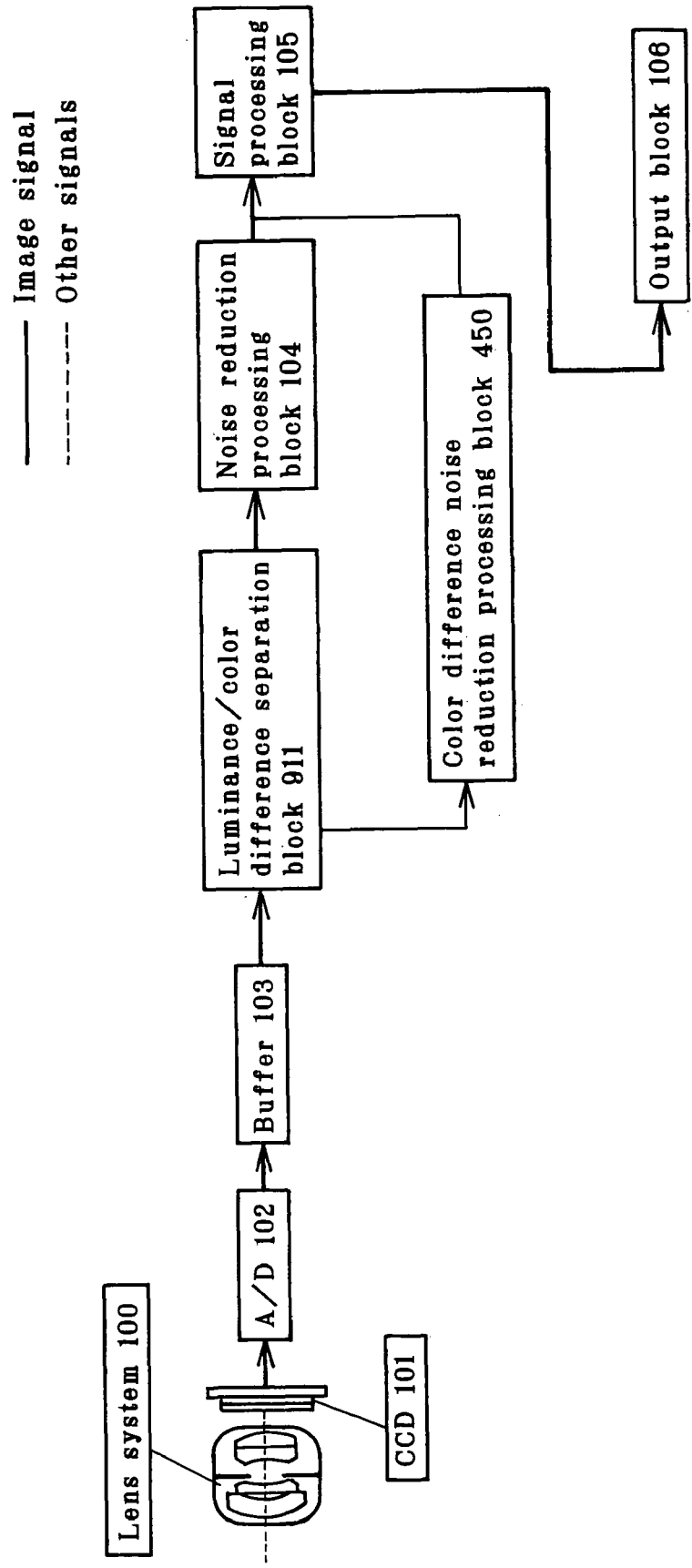
FIG. 25 is illustrative of the architecture of the fourth embodiment.
Figure 26:
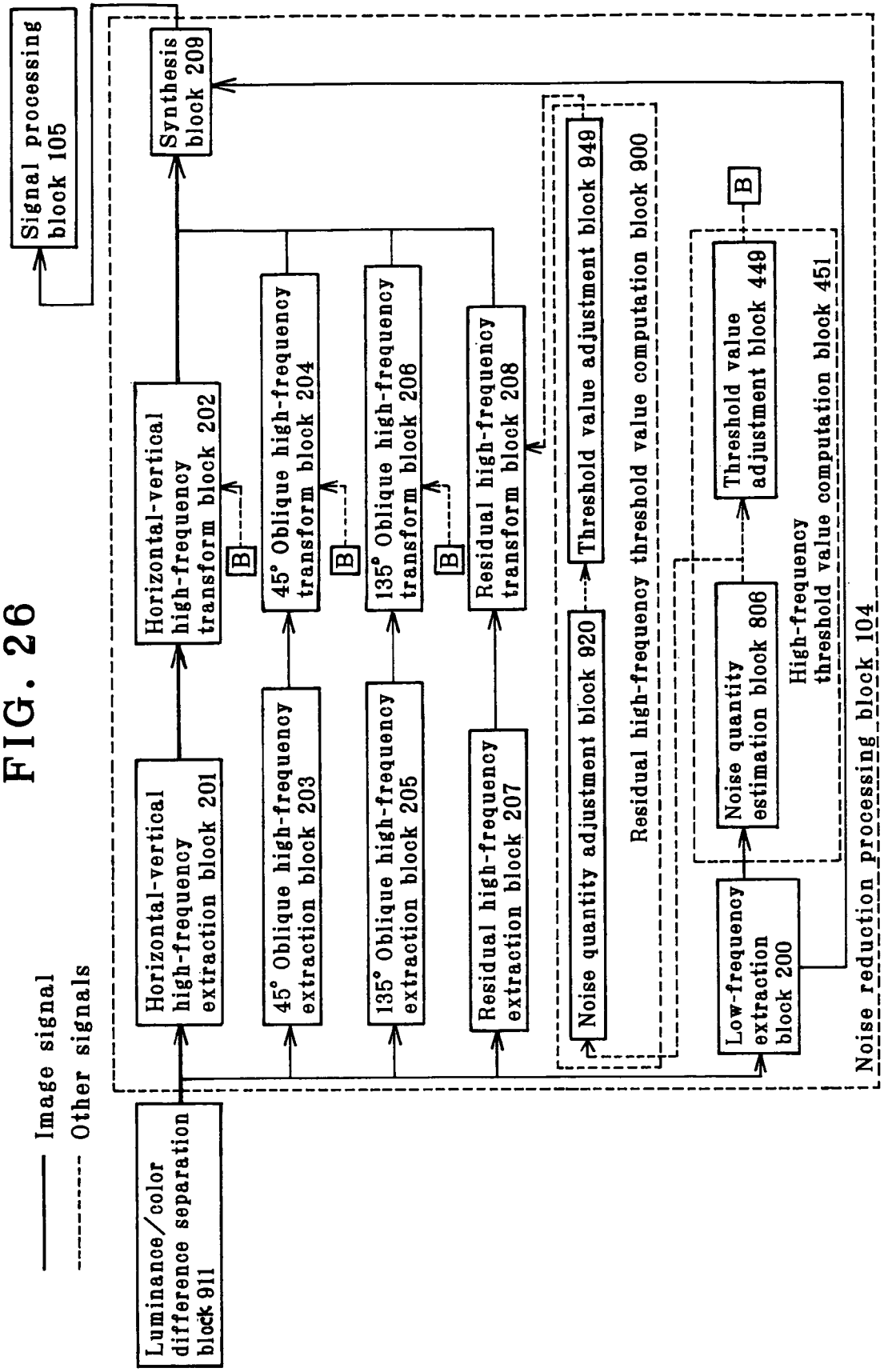
FIG. 26 is illustrative of the setup of a part of FIG. 24.
Figure 27:
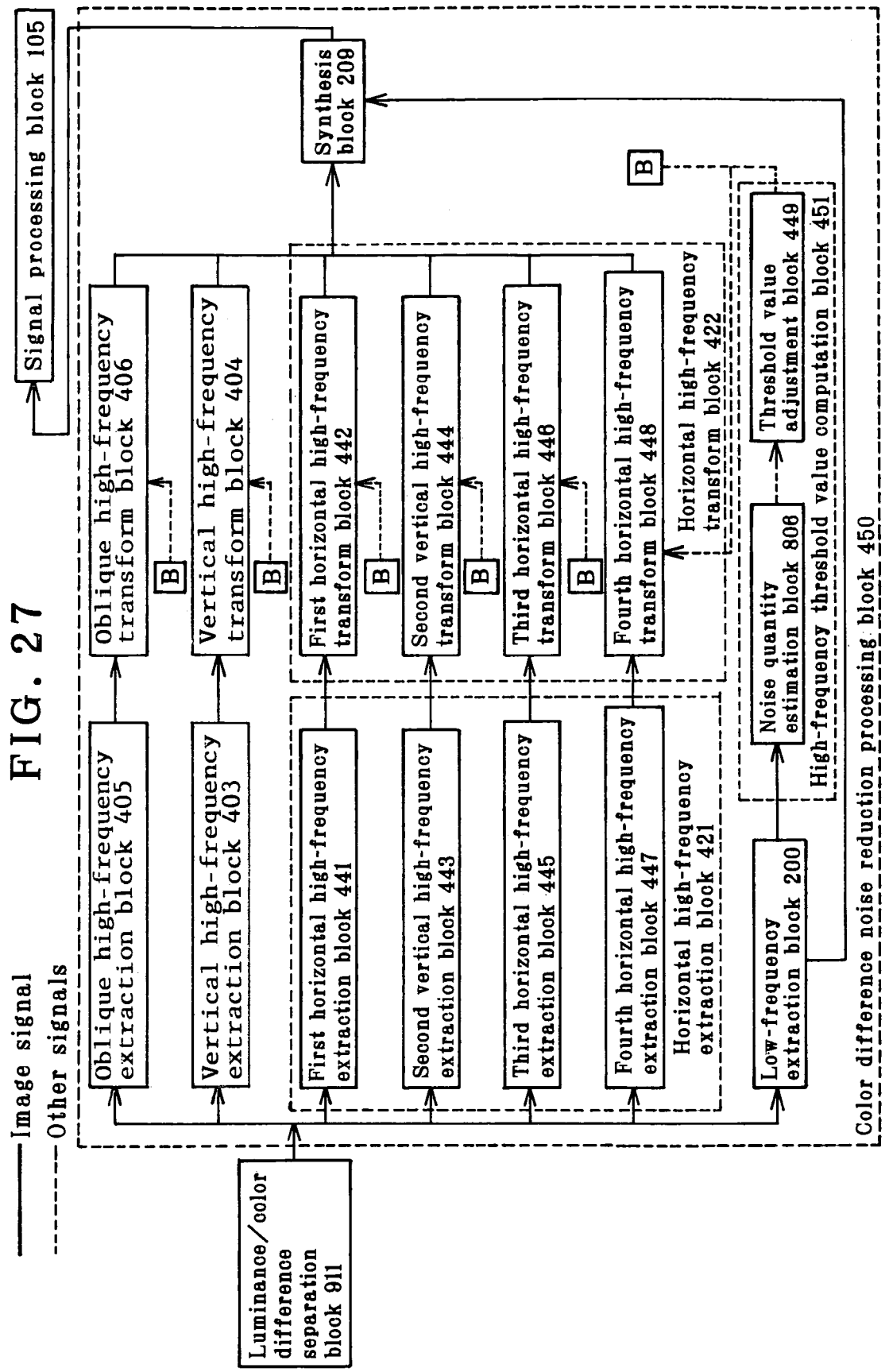
FIG. 27 is illustrative of the setup of another part of FIG. 24.

FIGS. 25, 26 and 27 are illustrative of the fourth embodiment of the invention. FIG. 25 is illustrative of the architecture of the fourth embodiment; FIG. 26 is illustrative of the setup of a part of FIG. 25; and FIG. 27 is illustrative of the setup of another part of FIG. 25. The high-frequency extraction filter of FIG. 4, the low-frequency extraction filter of FIG. 6, the residual high-frequency extraction filter of FIG. 8, the high-frequency extraction filter of FIG. 16 and the low-frequency extraction filter of FIG. 17 are applied to the fourth embodiment, too.

FIG. 25 is illustrative of an image processor according to the fourth embodiment of the invention. An image taken via a lens system 100 and CCD 101 is converted at A/D102 into digital signals and stored in a buffer 103. An RGB primary colors signal obtained at the buffer 103 is entered in a luminance/color difference separation block 911 where it is separated into a luminance signal (G) and a color difference signal (R-G, B-G). The luminance signal is entered in a noise reduction processing block 104, and the color difference signal is entered in a color difference noise reduction processing block 450, so that noise reduction processing is individually applied to them.

FIG. 26 is illustrative of the noise reduction processing block 104 for applying noise reduction processing to the luminance signal (G). A low-frequency extraction block 200 is built up of the low-frequency extraction filter shown in FIG. 6. A horizontal/vertical high-frequency extraction block 201, a 45° oblique high-frequency extraction block 203 and a 135° oblique high-frequency extraction block 205 are built up of the high-frequency extraction filters (H1 to H12) shown in FIG. 4. A residual high-frequency extraction filter 207 is built up of the residual high-frequency extraction filter shown in FIG. 8.

As explained with reference to FIG. 13, the high-frequency threshold value computation block 451 is built up of a noise quantity estimation block 806 and a threshold value adjustment block 449. The noise quantity estimation block 806 finds out the quantity of noise estimated to be included in the high-frequency components, entering the output in the threshold value adjustment block 449. The threshold value adjustment block 449 multiplies that quantity of noise by the adjustment value to figure out the threshold value. An output B of the threshold value worked out at the threshold value adjustment block 449 is entered in a horizontal/vertical high-frequency transform processing block 202, a 45° oblique high-frequency transform processing block 204 and a 135° oblique high-frequency transform processing block 206.

A residual high-frequency threshold value computation block 900 is built up of a noise quantity adjustment block 920 and a threshold value adjustment block 949. An output of the noise quantity estimation block 806 in the high-frequency threshold value computation block 451 is also entered in the noise quantity adjustment block 920 in the residual high-frequency threshold value computation block 900. An output of the noise quantity adjustment block 920 is entered in the threshold value adjustment block 949, and the noise quantity is multiplied by the adjustment value; the output is entered in the residual high-frequency transform processing block 208. An output of the high-frequency components with noise reduced at each high-frequency transform processing block 202 to 208 is entered in a synthesis block 209. An output of the low-frequency component with noise reduced at the low-frequency extraction block 200 is also entered in the synthesis block 202 for synthesis with the output of the high-frequency components. An output synthesized at the synthesis block 202 is sent out to a signal processing block 105 shown in FIG. 25.

FIG. 27 is illustrative of a color difference noise reduction processing block 450 for applying noise reduction processing to the color difference signal (R-G), (B-G). The low-frequency extraction block 200 is built up of the low-frequency extraction filter shown in FIG. 17. A horizontal high-frequency extraction block 421, a vertical high-frequency extraction block 403, and an oblique high-frequency extraction block 405 is built up of the high-frequency extraction filters (H1 to H12) shown in FIG. 16. The horizontal high-frequency extraction block 421 comprises a first horizontal high-frequency extraction block 441, a second horizontal high-frequency extraction block 443, a third horizontal high-frequency extraction block 445, and a fourth horizontal high-frequency extraction block 447, and the horizontal high-frequency transform block 422 comprises a first horizontal high-frequency transform block 442, a second horizontal high-frequency transform block 444, a third horizontal high-frequency transform block 446, and a fourth horizontal high-frequency transform block 448. The vertical high-frequency extraction block 403, and the oblique high-frequency extraction block 405, too, is built up of the first, second, third and fourth extraction blocks, as is the case with the horizontal high-frequency extraction block 421, and so is the vertical high-frequency transform block 404, and the oblique high-frequency transform block 406 too.

A color difference signal produced out of the luminance/color difference separation block 911 is entered in the horizontal high-frequency extraction block 421, the vertical high-frequency extraction block 403, the oblique high-frequency extraction block 405, and the low-frequency extraction block 200. At the low-frequency extraction block 200, the low-frequency component is extracted by a low-frequency extraction filter, and the output is entered in the synthesis block 209. An output of the low-frequency extraction block 200 is entered in the high-frequency threshold value computation block 451 built up of a noise quantity estimation block 806 and a threshold value adjustment block 449, as explained with reference to FIG. 26. An output B for the threshold value figured out by multiplying the noise quantity of the low-frequency component by the adjustment value at the threshold value adjustment block 449 is entered in the vertical high-frequency transform block 406, and the oblique high-frequency transform block 404 as well as in the first horizontal high-frequency transform block 442, the second high-frequency transform block 444, the third horizontal high-frequency transform block 446 and the fourth high-frequency transform block 448 in the horizontal high-frequency transform block 422.

At each high-frequency transform block (422, 404, 406), threshold value processing is applied to the high-frequency components entered from the luminance/color difference separation block 911 and extracted at each high-frequency extraction block (421, 403, 405) on the basis of the threshold value figured out at the aforesaid threshold value adjustment block 449.

By implementing such threshold value processing, the noise component is deleted out of the high-frequency components. The low-frequency component extracted at the low-frequency extraction block 200 and the high-frequency components with their noise components deleted at the vertical high-frequency transform block 406, the oblique high-frequency transform block 404 and the first to fourth high-frequency transform blocks (442 to 448) in the horizontal high-frequency transform block 422 are synthesized together at the synthesis block 209, thereby obtaining an image signal with reduced noise. This image signal is then sent out to the signal processing block 105 shown in FIG. 25.

The fourth embodiment of the invention is characterized in that the frequency separation characteristics for a luminance signal differ from that for a color difference signal. In the Bayer arrangement, the frequency characteristics of a luminance signal differ from those of a color difference signal. As explained with reference to FIGS. 26 and 27, transform processing may be applied to the luminance signal, and the color difference signal in the frequency separation ways well fit for them.

In each embodiment, by way of illustration but not by way of limitation, the invention has been described typically with reference to the Bayer arrangement.

INDUSTRIAL APPLICABILITY

As described above, according to the invention there can be an image processor provided that can be compatible with a change in the frequency characteristics at the time of processing image signals and offer a sensible tradeoff between proper noise reductions and maintaining the details of an image.

What we claim is:

1. An image processor, characterized by comprising a frequency division means for dividing an input signal into a low-frequency component and at least one high-frequency component, a high-frequency component transform means for applying transform processing to said high-frequency component, a frequency synthesis means for synthesizing said low-frequency component with the high-frequency component to which said transform processing has been applied, a frequency characteristics setting means for setting frequency characteristics needed for an output signal, a frequency characteristics adjustment means that applies further transform processing to an output signal from said frequency synthesis means to adjust frequency characteristics of the output signal to frequency characteristics set by said frequency characteristics setting means, and a frequency division characteristics setting means for setting division characteristics at said frequency division means depending on frequency characteristics set at the frequency characteristics setting means.

2. The image processor according to claim 1, characterized in that said frequency characteristics adjustment means comprises a given frequency component extraction means for extracting a given frequency component from an output signal from said frequency synthesis means, a given frequency component enhancement means for applying given enhancement processing to said given frequency component extracted by said given frequency component extraction means, and a given frequency component synthesis means for synthesizing said given frequency component to which said given enhancement processing has been applied by said given frequency component enhancement means with an output signal from said frequency synthesis means.

3. The image processor according to claim 1, characterized in that said frequency characteristics adjustment means further comprises a low-frequency component extraction means for extracting a given low-frequency component from an output signal from said frequency synthesis means, wherein said given frequency component synthesis means synthesizes said given frequency component to which said given enhancement processing has been applied by said given frequency component enhancement means with said given low-frequency component.

4. The image processor according to claim 1, characterized in that said high-frequency component transform means comprises a high-frequency component inhibition means for enhancing or inhibiting an element of said high-frequency component having a given range at a given high-frequency component, and a threshold value setting means for setting at least one threshold value that determines a given range.

5. The image processor according to claim 1, characterized in that said frequency characteristics setting means sets a coefficient for a given frequency extraction filter forming said given frequency component extraction means and/or a quantity of enhancement applied by said given enhancement processing.

6. The image processor according to claim 1, characterized in that said frequency division characteristics setting means sets a coefficient for at least one frequency division filter in the group of frequency division filters forming said frequency division means.

7. An image processor, characterized by comprising a frequency division means for dividing an input signal into a low-frequency component and at least one high-frequency component, a high-frequency component transform means for applying transform processing to said high-frequency component, a frequency synthesis means for synthesizing said low-frequency component with the high-frequency component to which transform processing has been applied, a noise characteristics estimation means for estimating noise characteristics of said input signal, and a frequency division characteristics setting means for setting division characteristics at the frequency division means depending on a result of estimation at said noise characteristics estimation means.

8. The image processor according to claim 7, characterized in that said high-frequency component transform means comprises a high-frequency component inhibition means for enhancing or inhibiting an element of said high-frequency component having a given range at a given high-frequency component, and a threshold value setting means for setting at least one threshold value for determining the given range.

9. The image processor according to claim 7, characterized in that the noise characteristics estimation means comprises a noise quantity estimation means for estimating the quantity of noise included in said input signal on the basis of at least one piece of information about an imaging device temperature, a gain with respect to said input image or a shutter speed at an image-taking time.

10. The image processor means according to claim 7, characterized in that the noise characteristics estimation means further comprises a gain computation means for finding out said gain on the basis of at least one piece of ISO sensitivity information, exposure information and white balance information.

11. The image processor according to claim 7, characterized in that said frequency division characteristics setting means sets a coefficient for at least one frequency division filter in the group of frequency division filters forming said frequency division means.

12. An image processor, characterized by comprising a frequency division means for dividing an input signal into a low-frequency component and at least one high-frequency component, a high-frequency component transform means for applying transform processing to said high-frequency component, a frequency synthesis means for synthesizing the low-frequency component with the high-frequency component to which transform processing has been applied, a frequency characteristics estimation means for estimating frequency characteristics of said input signal, and a frequency division characteristics setting means for setting division characteristics at the frequency division means on the basis of a result of estimation at said frequency characteristics estimation means.

13. The image processor according to claim 12, characterized in that said high-frequency component transform means comprises a high-frequency component inhibition means for enhancing or inhibiting an element of said high-frequency components having a given range at a given high-frequency component, and a threshold value setting means for setting at least one threshold value that determines a given range.

14. The image processor according to claim 12, characterized in that said frequency characteristics estimation means makes an estimation of frequency characteristics of signals corresponding to at least two color filters provided on a front surface of an imaging device for each pixel from information about what positions they are located in.

15. The image processor according to claim 12, characterized in that said frequency characteristics estimation means makes an estimation of the frequency characteristics of a color signal from the type of said color signal.

16. The image processor according to claim 12, characterized in that the frequency division characteristics setting means sets a coefficient for at least one frequency division filter in the group of frequency division filters that form said frequency division means.

* * * * *